(12) United States Patent
Hall et al.

(10) Patent No.: US 11,735,755 B2
(45) Date of Patent: *Aug. 22, 2023

(54) SYSTEM AND METHOD FOR INTEGRATED DEPOSITION AND HEATING

(71) Applicant: Utility Global, Inc., Houston, TX (US)

(72) Inventors: David R. Hall, Provo, UT (US); Matthew Dawson, Katy, TX (US); Nicholas Farandos, Bray (IE); Jin Dawson, Katy, TX (US)

(73) Assignee: UTILITY GLOBAL, INC., Houston, TX (US)

( * ) Notice: Subject to any disclaimer, the term of this patent is extended or adjusted under 35 U.S.C. 154(b) by 448 days.

This patent is subject to a terminal disclaimer.

(21) Appl. No.: 16/674,695

(22) Filed: Nov. 5, 2019

(65) Prior Publication Data

US 2021/0069786 A1 Mar. 11, 2021

Related U.S. Application Data

(60) Provisional application No. 62/928,326, filed on Oct. 30, 2019, provisional application No. 62/927,627, (Continued)

(51) Int. Cl.
*B22F 10/00* (2021.01)
*H01M 8/1246* (2016.01)
(Continued)

(52) U.S. Cl.
CPC ........... *H01M 8/1246* (2013.01); *B22F 10/00* (2021.01); *B29C 64/165* (2017.08); (Continued)

(58) Field of Classification Search
CPC ................. B23K 15/086; B28B 1/001; B22F 2003/1057
See application file for complete search history.

(56) References Cited

U.S. PATENT DOCUMENTS 4,374,906 A   2/1983   Breault et al.
4,749,632 A   6/1988   Flandermeyer et al.
(Continued)

FOREIGN PATENT DOCUMENTS

KR   20130047175   5/2013
WO   WO2004019434  3/2004
(Continued)

OTHER PUBLICATIONS

Ali, M. et al. "Mathematical modeling of pulsed electron beam induced heating and sublimation of graphite." 2015. ECS Journal solid state science and technology. 4. p. 369-375. (Year: 2015).*

(Continued)

*Primary Examiner* — Nicholas A Wang
(74) *Attorney, Agent, or Firm* — Foley & Lardner LLP

(57) ABSTRACT

Herein disclosed is a method of manufacturing comprises depositing a composition on a substrate slice by slice to form an object; heating in situ the object using electromagnetic radiation (EMR); wherein said composition comprises a first material and a second material, wherein the second material has a higher absorption of the radiation than the first material. In an embodiment, the EMR has a wavelength ranging from 10 to 1500 nm and the EMR has a minimum energy density of 0.1 Joule/cm$^2$. In an embodiment, the EMR comprises UV light, near ultraviolet light, near infrared light, infrared light, visible light, laser, electron beam. In an embodiment, said object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel, or combinations thereof.

18 Claims, 12 Drawing Sheets

Related U.S. Application Data filed on Oct. 29, 2019, provisional application No. 62/925,210, filed on Oct. 23, 2019, provisional application No. 62/912,626, filed on Oct. 8, 2019, provisional application No. 62/904,683, filed on Sep. 24, 2019, provisional application No. 62/899,087, filed on Sep. 11, 2019, provisional application No. 62/896,466, filed on Sep. 5, 2019, provisional application No. 62/895,416, filed on Sep. 3, 2019, provisional application No. 62/888,319, filed on Aug. 16, 2019, provisional application No. 62/877,699, filed on Jul. 23, 2019, provisional application No. 62/875,437, filed on Jul. 17, 2019, provisional application No. 62/869,322, filed on Jul. 1, 2019, provisional application No. 62/866,758, filed on Jun. 26, 2019, provisional application No. 62/864,492, filed on Jun. 20, 2019, provisional application No. 62/863,390, filed on Jun. 19, 2019, provisional application No. 62/856,736, filed on Jun. 3, 2019, provisional application No. 62/852,045, filed on May 23, 2019, provisional application No. 62/849,269, filed on May 17, 2019, provisional application No. 62/847,472, filed on May 14, 2019, provisional application No. 62/844,126, filed on May 7, 2019, provisional application No. 62/844,127, filed on May 7, 2019, provisional application No. 62/840,381, filed on Apr. 29, 2019, provisional application No. 62/839,587, filed on Apr. 26, 2019, provisional application No. 62/837,089, filed on Apr. 22, 2019, provisional application No. 62/834,531, filed on Apr. 16, 2019, provisional application No. 62/827,800, filed on Apr. 1, 2019, provisional application No. 62/825,576, filed on Mar. 28, 2019, provisional application No. 62/824,229, filed on Mar. 26, 2019, provisional application No. 62/819,374, filed on Mar. 15, 2019, provisional application No. 62/819,289, filed on Mar. 15, 2019, provisional application No. 62/814,695, filed on Mar. 6, 2019, provisional application No. 62/809,602, filed on Feb. 23, 2019, provisional application No. 62/808,644, filed on Feb. 21, 2019, provisional application No. 62/805,250, filed on Feb. 13, 2019, provisional application No. 62/804,115, filed on Feb. 11, 2019, provisional application No. 62/798,344, filed on Jan. 29, 2019, provisional application No. 62/797,572, filed on Jan. 28, 2019, provisional application No. 62/791,629, filed on Jan. 11, 2019, provisional application No. 62/786,341, filed on Dec. 29, 2018, provisional application No. 62/784,472, filed on Dec. 23, 2018, provisional application No. 62/783,192, filed on Dec. 20, 2018, provisional application No. 62/780,211, filed on Dec. 15, 2018, provisional application No. 62/779,005, filed on Dec. 13, 2018, provisional application No. 62/777,273, filed on Dec. 10, 2018, provisional application No. 62/777,338, filed on Dec. 10, 2018, provisional application No. 62/773,912, filed on Nov. 30, 2018, provisional application No. 62/773,071, filed on Nov. 29, 2018, provisional application No. 62/771,045, filed on Nov. 24, 2018, provisional application No. 62/768,864, filed on Nov. 17, 2018, provisional application No. 62/767,413, filed on Nov. 14, 2018, provisional application No. 62/758,778, filed on Nov. 12, 2018, provisional application No. 62/757,751, filed on Nov. 8, 2018, provisional application No. 62/756,257, filed on Nov. 6, 2018, provisional application No. 62/756,264, filed on Nov. 6, 2018.

(51) Int. Cl.

| | | |
|---|---|---|
| *B29C 64/165* | (2017.01) | |
| *B29C 64/273* | (2017.01) | |
| *B29C 64/295* | (2017.01) | |
| *B33Y 10/00* | (2015.01) | |
| *B33Y 80/00* | (2015.01) | |
| *H01M 8/2404* | (2016.01) | |
| *B29C 64/182* | (2017.01) | |
| *B33Y 70/00* | (2020.01) | |
| *H01M 4/88* | (2006.01) | |
| *H01M 4/90* | (2006.01) | |
| H01M 8/12 | (2016.01) | |
| B29L 31/34 | (2006.01) | |
| B33Y 70/10 | (2020.01) | |
| B29K 505/00 | (2006.01) | |
| B29K 509/02 | (2006.01) | |

(52) U.S. Cl.
CPC .......... *B29C 64/182* (2017.08); *B29C 64/273* (2017.08); *B29C 64/295* (2017.08); *B33Y 10/00* (2014.12); *B33Y 70/00* (2014.12); *B33Y 80/00* (2014.12); *H01M 4/8832* (2013.01); *H01M 4/9016* (2013.01); *H01M 8/2404* (2016.02); *B22F 2202/05* (2013.01); *B22F 2202/11* (2013.01); *B22F 2301/15* (2013.01); *B22F 2301/205* (2013.01); *B22F 2302/25* (2013.01); *B29K 2505/00* (2013.01); *B29K 2509/02* (2013.01); *B29L 2031/3468* (2013.01); *B33Y 70/10* (2020.01); *H01M 2008/1293* (2013.01)

(56) References Cited

U.S. PATENT DOCUMENTS

| | | | |
|---|---|---|---|
| 4,992,341 A | 2/1991 | Smith et al. | |
| 5,364,712 A | 11/1994 | Townsend | |
| 5,431,967 A | 7/1995 | Manthiram et al. | |
| 5,554,454 A | 9/1996 | Gardner et al. | |
| 5,908,713 A | 5/1999 | Reiter et al. | |
| 6,399,233 B1 | 6/2002 | Milliken et al. | |
| 6,645,660 B2 | 11/2003 | Datz et al. | |
| 6,890,679 B2 | 5/2005 | Johnsen et al. | |
| 7,141,271 B2 | 11/2006 | Barbezat et al. | |
| 7,682,725 B2 | 3/2010 | Datz et al. | |
| 7,909,971 B2 | 3/2011 | Nuzzo et al. | |
| 8,163,353 B2 | 4/2012 | Lu | |
| 8,211,587 B2 | 7/2012 | Ruka et al. | |
| 9,327,448 B2 | 5/2016 | Shah et al. | |
| 10,236,528 B2 | 3/2019 | Jakus et al. | |
| 10,350,329 B2 | 7/2019 | Shah et al. | |
| 10,759,084 B1 * | 9/2020 | Sullivan | B33Y 10/00 |
| 2002/0028367 A1 | 3/2002 | Sammes et al. | |
| 2002/0081481 A1 | 6/2002 | Keegan | |
| 2002/0102450 A1 | 8/2002 | Badding et al. | |
| 2003/0134171 A1 | 7/2003 | Sarkar et al. | |
| 2003/0190503 A1 | 10/2003 | Kumar et al. | |
| 2003/0235738 A1 | 12/2003 | Zheng | |
| 2004/0000489 A1 | 1/2004 | Zhang et al. | |
| 2004/0151957 A1 | 8/2004 | Brooks et al. | |
| 2004/0166380 A1 | 8/2004 | Gorte et al. | |
| 2005/0016839 A1 | 1/2005 | Horne et al. | |
| 2005/0053819 A1 | 3/2005 | Paz | |
| 2005/0118493 A1 | 6/2005 | Datz et al. | |
| 2006/0228613 A1 | 10/2006 | Bourgeois et al. | |
| 2007/0202378 A1 | 8/2007 | D'Urso et al. | |
| 2008/0008826 A1 | 1/2008 | Coulon et al. | |
| 2008/0085369 A1 | 4/2008 | Cai et al. | |
| 2008/0160376 A1 | 7/2008 | Badding et al. | |

(56) References Cited

U.S. PATENT DOCUMENTS

| | | |
|---|---|---|
| 2008/0178461 A1 | 7/2008 | Koripella et al. |
| 2008/0220307 A1 | 9/2008 | Fukushima et al. |
| 2010/0099000 A1 | 4/2010 | Kanba et al. |
| 2010/0136376 A1 | 5/2010 | Leah et al. |
| 2011/0070493 A1 | 3/2011 | Gadkaree et al. |
| 2011/0111292 A1 | 5/2011 | Kwon et al. |
| 2011/0120537 A1 | 5/2011 | Liu et al. |
| 2011/0171555 A1 | 7/2011 | Oloman |
| 2012/0032120 A1 | 2/2012 | Tan et al. |
| 2012/0070746 A1 | 3/2012 | Mikhaylik et al. |
| 2012/0183858 A1 | 7/2012 | Ellenwood et al. |
| 2013/0026032 A1 | 1/2013 | Pal et al. |
| 2013/0228547 A1 | 9/2013 | Scorsone et al. |
| 2013/0344383 A1 | 12/2013 | Loveness et al. |
| 2014/0051014 A1 | 2/2014 | Steinwandel et al. |
| 2014/0059846 A1 | 3/2014 | Schaefer |
| 2014/0072702 A1 | 3/2014 | Sullivan |
| 2014/0315095 A1 | 10/2014 | Honkawa et al. |
| 2014/0352573 A1 | 12/2014 | Kasperchik et al. |
| 2014/0367894 A1 | 12/2014 | Kramer et al. |
| 2015/0035200 A1 | 2/2015 | Karpas et al. |
| 2015/0158728 A1 | 6/2015 | Liang et al. |
| 2015/0290860 A1* | 10/2015 | Shaw ............... B33Y 70/00 |
| | | 264/255 |
| 2016/0067827 A1 | 3/2016 | Zediker |
| 2016/0104882 A1 | 4/2016 | Yushin et al. |
| 2016/0167132 A1 | 6/2016 | Panat |
| 2016/0197356 A1 | 7/2016 | Montinaro et al. |
| 2016/0368056 A1 | 12/2016 | Swaminathan et al. |
| 2017/0012319 A1 | 1/2017 | Ananden et al. |
| 2017/0072633 A1* | 3/2017 | Hsu .................. B29C 64/106 |
| 2017/0081534 A1 | 3/2017 | Shah et al. |
| 2017/0098857 A1 | 4/2017 | Carlson et al. |
| 2017/0222236 A1 | 8/2017 | Armstrong et al. |
| 2017/0246761 A1* | 8/2017 | Champion ........... B33Y 50/02 |
| 2017/0304944 A1* | 10/2017 | Symeonidis ........ B23K 15/02 |
| 2017/0346084 A1 | 11/2017 | Sakshaug et al. |
| 2018/0006301 A1 | 1/2018 | Im et al. |
| 2018/0019493 A1 | 1/2018 | Jakus et al. |
| 2018/0056292 A1 | 3/2018 | Kwon et al. |
| 2018/0072630 A1* | 3/2018 | Beaman .............. C04B 35/64 |
| 2018/0212083 A1 | 7/2018 | Kim et al. |
| 2018/0250746 A1 | 9/2018 | Symeonidis et al. |
| 2018/0301420 A1 | 10/2018 | Kim et al. |
| 2019/0134898 A1* | 5/2019 | Zhao ................. B29C 64/112 |
| 2019/0207227 A1 | 7/2019 | Farandos et al. |
| 2021/0187834 A1* | 6/2021 | Hartman ............ B33Y 30/00 |

FOREIGN PATENT DOCUMENTS

| | | |
|---|---|---|
| WO | WO2015076005 | 5/2015 |
| WO | WO2017207514 | 12/2017 |
| WO | WO2017221010 | 12/2017 |
| WO | WO2018038954 | 3/2018 |
| WO | WO2018068662 | 4/2018 |
| WO | WO2018068663 | 5/2018 |
| WO | WO2018080537 | 5/2018 |

OTHER PUBLICATIONS

Zarkov, A. et al. "Preparation by different methods and analytical characterization of gadoonium-doped ceria" 2018. Chem, papers. 72. p. 129-138. (Year: 2018).*

Obraztsov, P. et al. "Broadband light-induced absorbance change in multilayer graphene." 2011. Nano letters. 11. p. 1540-1545. (Year: 2011).*

Das, S. et al. "Potential for multi-functional additive manufacturing using pulsed photonic sintering." 2015. Procedia Manufacturing. 1. p. 366-377. (Year: 2015).*

Ferrage, L. et al. "Dense yttria-stabilized zirconia obtained by direct selective laser sintering." 2018. Additive manufacturing. 21. p. 472-478. (Year: 2018).*

Price, M. et al. "Formation of YSZ-SDC solid solution in a nanocrystalline heterophase system and its effect on the electrical conductivity." 2005. J. Am. Ceram. Soc. 88. p. 1812-1818. (Year: 2005).*

Akanksha Umrani Fabrication of Micro Pillar Arrays via Aerosol Jet Printing, Rochester Institute of Technology, Rochester, NY, USA, Dissertation, Jan. 2015.

Nicholas M. Farandos, Inkjet Printing for Solid Oxide Electrochemical Reactors, Imperial College London, UK, Department of Chemical Engineering Dissertation, May 2018.

N.M. Farandos et al., Three-dimensiona Inkjet Printed Solid Oxide Electrochemical Reactors, Electrochemica Acta 213 (2016), 324-331.

N. Geisendorfer, Efficient and Scalable Fabrication of Solid Oxide Fuel Cells via 3D-Printing, NASA, Sep. 15, 2017.

N. Farandos, Additive Manufacturing—The Printing Press Meets Energy Storage?, Energy Futures Lab Blog, Feb. 14, 2017.

X.Y. Tai et al, Accelerating Fuel Cell Development With Additive Manufacturing Technologies, Fuel Cells, vol. 19 (2016), 636-650.

Wang et al. Electrical and Ionic Conductivity of Gd-Doped Ceria, J Electrochemical Society, vol. 147, pp. 3606-3609, 2000.

Kharton et al., Mixed Electronic and Ionic Conductivity of LaCo(M)O3 (M=Ga,Cr,Fe or Ni) Solid State Ionics, 1997, v104, p. 68, 76, Elsevier.

* cited by examiner

SYSTEM AND METHOD FOR INTEGRATED DEPOSITION AND HEATING

CROSS-REFERENCE TO RELATED APPLICATIONS

This application claims the benefit under 35 U.S.C. 119(e) of U.S. Provisional Patent Application No. 62/756,257 filed Nov. 6, 2018, U.S. Provisional Patent Application No. 62/756,264 filed Nov. 6, 2018, U.S. Provisional Patent Application No. 62/757,751 filed Nov. 8, 2018, U.S. Provisional Patent Application No. 62/758,778 filed Nov. 12, 2018, U.S. Provisional Patent Application No. 62/767,413 filed Nov. 14, 2018, U.S. Provisional Patent Application No. 62/768,864 filed Nov. 17, 2018, U.S. Provisional Patent Application No. 62/771,045 filed Nov. 24, 2018, U.S. Provisional Patent Application No. 62/773,071 filed Nov. 29, 2018, U.S. Provisional Patent Application No. 62/773,912 filed Nov. 30, 2018, U.S. Provisional Patent Application No. 62/777,273 filed Dec. 10, 2018, U.S. Provisional Patent Application No. 62/777,338 filed Dec. 10, 2018, U.S. Provisional Patent Application No. 62/779,005 filed Dec. 13, 2018, U.S. Provisional Patent Application No. 62/780,211 filed Dec. 15, 2018, U.S. Provisional Patent Application No. 62/783,192 filed Dec. 20, 2018, U.S. Provisional Patent Application No. 62/784,472 filed Dec. 23, 2018, U.S. Provisional Patent Application No. 62/786,341 filed Dec. 29, 2018, U.S. Provisional Patent Application No. 62/791,629 filed Jan. 11, 2019, U.S. Provisional Patent Application No. 62/797,572 filed Jan. 28, 2019, U.S. Provisional Patent Application No. 62/798,344 filed Jan. 29, 2019, U.S. Provisional Patent Application No. 62/804,115 filed Feb. 11, 2019, U.S. Provisional Patent Application No. 62/805,250 filed Feb. 13, 2019, U.S. Provisional Patent Application No. 62/808,644 filed Feb. 21, 2019, U.S. Provisional Patent Application No. 62/809,602 filed Feb. 23, 2019, U.S. Provisional Patent Application No. 62/814,695 filed Mar. 6, 2019, U.S. Provisional Patent Application No. 62/819,374 filed Mar. 15, 2019, U.S. Provisional Patent Application No. 62/819,289 filed Mar. 15, 2019, U.S. Provisional Patent Application No. 62/824,229 filed Mar. 26, 2019, U.S. Provisional Patent Application No. 62/825,576 filed Mar. 28, 2019, U.S. Provisional Patent Application No. 62/827,800 filed Apr. 1, 2019, U.S. Provisional Patent Application No. 62/834,531 filed Apr. 16, 2019, U.S. Provisional Patent Application No. 62/837,089 filed Apr. 22, 2019, U.S. Provisional Patent Application No. 62/840,381 filed Apr. 29, 2019, U.S. Provisional Patent Application No. 62/844,125 filed May 7, 2019, U.S. Provisional Patent Application No. 62/844,127 filed May 7, 2019, U.S. Provisional Patent Application No. 62/847,472 filed May 14, 2019, U.S. Provisional Patent Application No. 62/849,269 filed May 17, 2019, U.S. Provisional Patent Application No. 62/852,045 filed May 23, 2019, U.S. Provisional Patent Application No. 62/856,736 filed Jun. 3, 2019, U.S. Provisional Patent Application No. 62/863,390 filed Jun. 19, 2019, U.S. Provisional Patent Application No. 62/864,492 filed Jun. 20, 2019, U.S. Provisional Patent Application No. 62/866,758 filed Jun. 26, 2019, U.S. Provisional Patent Application No. 62/869,322 filed Jul. 1, 2019, U.S. Provisional Patent Application No. 62/875,437 filed Jul. 17, 2019, U.S. Provisional Patent Application No. 62/877,699 filed Jul. 23, 2019, U.S. Provisional Patent Application No. 62/888,319 filed Aug. 16, 2019, U.S. Provisional Patent Application No. 62/895,416 filed Sep. 3, 2019, U.S. Provisional Patent Application No. 62/896,466 filed Sep. 5, 2019, U.S. Provisional Patent Application No. 62/899,087 filed on Sep. 11, 2019, U.S. Provisional Patent Application No. 62/904,683 filed on Sep. 24, 2019, U.S. Provisional Patent Application No. 62/912,626 filed on Oct. 8, 2019, U.S. Provisional Patent Application No. 62/925,210 filed on Oct. 23, 2019, U.S. Provisional Patent Application No. 62/927,627 filed on Oct. 29, 2019, U.S. Provisional Patent Application No. 62/928,326 filed on Oct. 30, 2019. The disclosures of each of said applications are hereby incorporated herein by reference.

TECHNICAL FIELD

This invention generally relates to system and method of deposition and heating. More specifically, this invention relates to system and method for integrated deposition and heating.

BACKGROUND

A fuel cell is an electrochemical apparatus that converts the chemical energy from a fuel into electricity through an electrochemical reaction. Sometimes, the heat generated by a fuel cell is also usable. There are many types of fuel cells. For example, proton-exchange membrane fuel cells (PEMFCs) are built out of membrane electrode assemblies (MEA) which include the electrodes, electrolyte, catalyst, and gas diffusion layers. An ink of catalyst, carbon, and electrode are sprayed or painted onto the solid electrolyte and carbon paper is hot pressed on either side to protect the inside of the cell and also act as electrodes. The most important part of the cell is the triple phase boundary where the electrolyte, catalyst, and reactants mix and thus where the cell reactions actually occur. The membrane must not be electrically conductive so that the half reactions do not mix.

PEMFC is a good candidate for vehicle and other mobile applications of all sizes (e.g., mobile phones) because it is compact. However, the water management is crucial to performance: too much water will flood the membrane, too little will dry it; in both cases, power output will drop. Water management is a difficult problem in PEM fuel cell systems, mainly because water in the membrane is attracted toward the cathode of the cell through polarization. Furthermore, the platinum catalyst on the membrane is easily poisoned by carbon monoxide (CO level needs to be no more than one part per million). The membrane is also sensitive to things like metal ions, which can be introduced by corrosion of metallic bipolar plates, or metallic components in the fuel cell system, or from contaminants in the fuel and/or oxidant.

Solid oxide fuel cells (SOFCs) are a different class of fuel cells that use a solid oxide material as the electrolyte. SOFCs use a solid oxide electrolyte to conduct negative oxygen ions from the cathode to the anode. The electrochemical oxidation of the oxygen ions with fuel (e.g., hydrogen, carbon monoxide) occurs on the anode side. Some SOFCs use proton-conducting electrolytes (PC-SOFCs), which transport protons instead of oxygen ions through the electrolyte. Typically, SOFCs using oxygen ion conducting electrolytes have higher operating temperatures than PC-SOFCs. In addition, SOFCs do not typically require expensive platinum catalyst material, which is typically necessary for lower temperature fuel cells such as proton-exchange membrane fuel cells (PEMFCs), and are not vulnerable to carbon monoxide catalyst poisoning. Solid oxide fuel cells have a wide variety of applications, such as auxiliary power units for homes and vehicles as well as stationary power generation units for data centers. SOFCs comprise interconnects, which are placed between each individual cell so that the cells are connected in series and that the electricity generated by each cell is combined. One category of SOFC is segmented-in-series (SIS) type SOFC, in which electrical current flow is parallel to the electrolyte in the lateral direction. Contrary to the SIS type SOFC, a different category of SOFC has electrical current flow perpendicular to the electrolyte in the lateral direction. These two categories of SOFCs are connected differently and made differently.

For the fuel cell to function properly and continuously, components for balance of plant (BOP) are needed. For example, the mechanical balance of plant includes air preheater, reformer and/or pre-reformer, afterburner, water heat exchanger, anode tail gas oxidizer. Other components are also needed, such as, electrical balance of plant including power electronics, hydrogen sulfide sensors, and fans. These BOP components are often complex and expensive. Fuel cells and fuel cell systems are simply examples of the necessity and interest to develop advanced manufacturing system and method such that these efficient systems may be economically produced and widely deployed.

The manufacturing of devices and catalysts is often a complex and expensive process. For example, traditionally to make a fuel cell could require more than 100 steps utilizing dozens of machines. Furthermore, the deposition step and the heating/curing/sintering step are often dissociated with one another. Herein we disclose an integrated deposition and heating process that would significantly reduce manufacturing complexity and cost.

SUMMARY

Herein discussed is a method of manufacturing comprises depositing a composition on a substrate slice by slice to form an object; heating in situ the object using electromagnetic radiation (EMR); wherein said composition comprises a first material and a second material, wherein the second material has a higher absorption of the radiation than the first material. In an embodiment, the EMR has a wavelength ranging from 10 to 1500 nm and the EMR has a minimum energy density of 0.1 Joule/cm$^2$. In an embodiment, the EMR comprises UV light, near ultraviolet light, near infrared light, infrared light, visible light, laser, electron beam. In an embodiment, said object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel, or combinations thereof.

In an embodiment, the second material is a deposited in the same slice as the first material or wherein the second material is a deposited in a slice adjacent another slice that contains the first material. In an embodiment, said heating removes at least a portion of the second material. In an embodiment, said removing leaves minimal residue of the portion of the second material. In an embodiment, the second material adds thermal energy to the first material during heating.

In an embodiment, the second material has a radiation absorption that is at least 5 times that of the first material; or the second material has a radiation absorption that is at least 10 times that of the first material; or the second material has a radiation absorption that is at least 50 times that of the first material; or the second material has a radiation absorption that is at least 100 times that of the first material. In an embodiment, the second material has a peak absorbance wavelength no less than 200 nm, or no less than 250 nm, or no less than 300 nm, or no less than 400 nm, or no less than 500 nm. In an embodiment, the first material has a peak absorbance wavelength no greater than 700 nm, or no greater than 600 nm, or no greater than 500 nm, or no greater than 400 nm, or no greater than 300 nm. In an embodiment, the EMR has a wavelength no less than 200 nm, or no less than 250 nm, or no less than 300 nm, or no less than 400 nm, or no less than 500 nm.

In an embodiment, the second material comprises carbon, nickel oxide, nickel, silver, copper, CGO, SDC, NiO—YSZ, NiO—SSZ, LSCF, LSM, doped lanthanum chromite ferritic steels, or combinations thereof. In an embodiment, the second material comprises carbon in the form of graphite, graphene, carbon nanoparticles, nano diamonds, or combinations thereof. In an embodiment, the first material comprises Yttria-stabilized zirconia (YSZ), 8YSZ (8 mol % YSZ powder), Yttirum, Zirconium, gadolinia-doped ceria (GDC or CGO), Samaria-doped ceria (SDC), Scandia-stabilized zirconia (SSZ), Lanthanum strontium manganite (LSM), Lanthanum Strontium Cobalt Ferrite (LSCF), Lanthanum Strontium Cobaltite (LSC), Lanthanum Strontium Gallium Magnesium Oxide (LSGM), Nickel, NiO, NiO—YSZ, Cu—CGO, Cu$_2$O, CuO, Cerium, copper, silver, crofer, steel, lanthanum chromite, doped lanthanum chromite, ferritic steel, stainless steel, or combinations thereof. In an embodiment, the first material comprises YSZ, SSZ, CGO, SDC, NiO—YSZ, LSM-YSZ, CGO-LSCF, doped lanthanum chromite, stainless steel, or combinations thereof.

In an embodiment, said depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In an embodiment, the depositing is accomplished by inkjet printing. In an embodiment, the method comprises controlling distance from the EMR to the substrate, EMR energy density, EMR spectrum, EMR voltage, EMR exposure duration, EMR exposure area, EMR exposure volume, EMR burst frequency, number of EMR exposures, or combinations thereof. In an embodiment, the object does not change location between depositing and heating. In an embodiment, the EMR has a power output of no less than 1 W, or 10 W, or 100 W, or 1000 W. In an embodiment, the EMR is provided by a xenon lamp.

Further aspects and embodiments are provided in the following drawings, detailed description and claims. Unless specified otherwise, the features as discussed herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
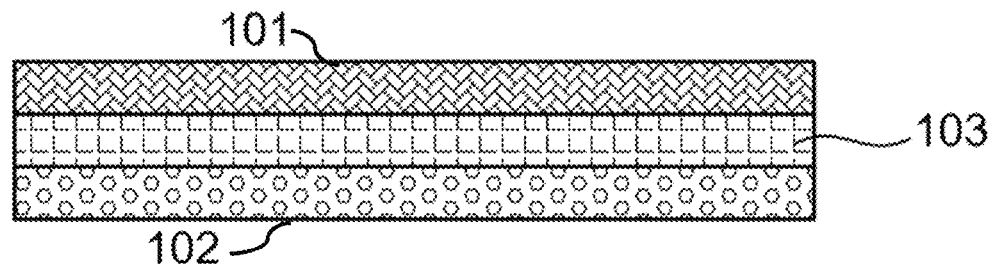
FIG. 1 illustrates a fuel cell comprising an anode, an electrolyte, and a cathode, according to an embodiment of this disclosure.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art.

In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

In situ in this disclosure refers to the treatment (e.g., heating) process being performed either at the same location or in the same device of the forming process of the compositions or materials. For example, the deposition process and the heating process are performed in the same device and at the same location, in other words, without changing the device and without changing the location within the device. For example, the deposition process and the heating process are performed in the same device at different locations, which is also considered in situ.

In this disclosure, a major face of an object is the face of the object that has a surface area larger than the average surface area of the object, wherein the average surface area of the object is the total surface area of the object divided by the number of faces of the object. In some cases, a major face refers to a face of an item or object that has a larger surface area than a minor face. In the cases of planar fuel cells or non-SIS type fuel cells, a major face is the face or surface in the lateral direction.

As used herein, the phrase "strain rate tensor" or "SRT" is meant to refer to the rate of change of the strain of a material in the vicinity of a certain point and at a certain time. It can be defined as the derivative of the strain tensor with respect to time. When SRTs or difference of SRTs are compared in this disclosure, it is the magnitude that is being used.

As used herein, lateral refers to the direction that is perpendicular to the stacking direction of the layers in a non-SIS type fuel cell. Thus, lateral direction refers to the direction that is perpendicular to the stacking direction of the layers in a fuel cell or the stacking direction of the slices to form an object during deposition. Lateral also refers to the direction that is the spread of deposition process.

Syngas (i.e., synthesis gas) in this disclosure refers to a mixture consisting primarily of hydrogen, carbon monoxide, and carbon dioxide.

In this disclosure, absorbance is a measure of the capacity of a substance to absorb electromagnetic radiation (EMR) of a wavelength.

Absorption of radiation refers to the energy absorbed by a substance when exposed to the radiation.

This discussion takes the production of solid oxide fuel cells (SOFCs) as an example. As one in the art recognizes, the methodology and the manufacturing process are applicable to any electrochemical device, reactor, vessel, catalyst, etc. Examples of electrochemical device include electrochemical (EC) gas producer, electrochemical (EC) compressor. Catalysts include Fischer Tropsch (FT) catalyst, reformer catalyst. Reactor/vessel includes FT reactor, heat exchanger.

Integrated Deposition and Heating

Herein disclosed is a method comprising depositing a composition on a substrate slice by slice to form an object; heating in situ the object using electromagnetic radiation (EMR); wherein said composition comprises a first material and a second material, wherein the second material has a higher absorbance of the radiation than the first material. In various embodiments, heating causes an effect comprising drying, curing, sintering, annealing, sealing, alloying, evaporating, restructuring, foaming, or combinations thereof. In an embodiment, the EMR has a peak wavelength ranging from 10 to 1500 nm and the EMR has a minimum energy density of 0.1 Joule/cm$^2$, wherein the peak wavelength is on the basis of relative irradiance with respect to wavelength. In an embodiment, the EMR comprises UV light, near ultraviolet light, near infrared light, infrared light, visible light, laser, electron beam.

Figure 6:
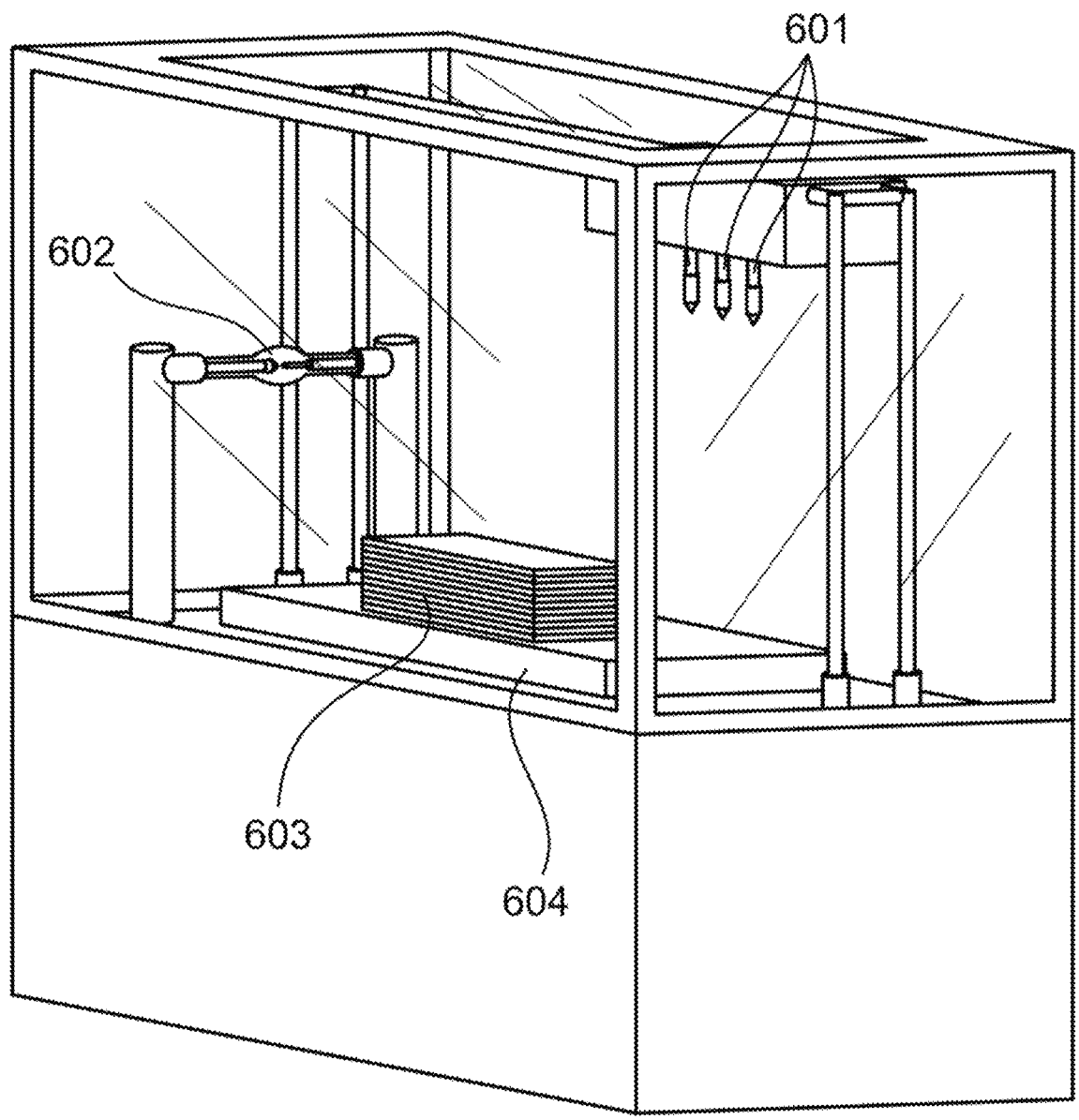
FIG. 6 illustrates a method and system of integrated deposition and heating using electromagnetic radiation (EMR), according to an embodiment of this disclosure.

FIG. 6 illustrates an object on a substrate formed by deposition nozzles and EMR for heating in situ, according to an embodiment of this disclosure.

In an embodiment, the first material comprises Yttria-stabilized zirconia (YSZ), 8YSZ (8 mol % YSZ powder), Yttirum, Zirconium, gadolinia-doped ceria (GDC or CGO), Samaria-doped ceria (SDC), Scandia-stabilized zirconia (SSZ), Lanthanum strontium manganite (LSM), Lanthanum Strontium Cobalt Ferrite (LSCF), Lanthanum Strontium Cobaltite (LSC), Lanthanum Strontium Gallium Magnesium Oxide (LSGM), Nickel, NiO, NiO—YSZ, Cu—CGO, Cu$_2$O, CuO, Cerium, copper, silver, crofer, steel, lanthanum chromite, doped lanthanum chromite, ferritic steel, stainless steel, or combinations thereof. In an embodiment, the first material comprises YSZ, SSZ, CGO, SDC, NiO—YSZ, LSM-YSZ, CGO-LSCF, doped lanthanum chromite, stainless steel, or combinations thereof. In an embodiment, the second material comprises carbon, nickel oxide, nickel, silver, copper, CGO, SDC, NiO—YSZ, NiO—SSZ, LSCF, LSM, doped lanthanum chromite ferritic steels, or combinations thereof. In an embodiment, said object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel, or combinations thereof.

In an embodiment, the second material is a deposited in the same slice as the first material. In an embodiment, the second material is a deposited in a slice adjacent another slice that contains the first material. In an embodiment, said heating removes at least a portion of the second material. In an embodiment, said removing leaves minimal residue of the portion of the second material. Preferably, this step leaves minimal residue of the portion of the second material, which is to say that there is no significant residue that would interfere with the subsequent steps in the process or the operation of the device being constructed. More preferably, this leaves no measurable reside of the portion of the second material.

In an embodiment, the second material adds thermal energy to the first material during heating. In an embodiment, the second material has a radiation absorbance that is at least 5 times that of the first material; or the second material has a radiation absorbance that is at least 10 times that of the first material; the second material has a radiation absorbance that is at least 50 times that of the first material; the second material has a radiation absorbance that is at least 100 times that of the first material.

In an embodiment, the second material has a peak absorbance wavelength no less than 200 nm, or 250 nm, or 300 nm, or 400 nm, or 500 nm. In an embodiment, the first material has a peak absorbance wavelength no greater than 700 nm, or 600 nm, or 500 nm, or 400 nm, or 300 nm. In an embodiment, the EMR has a peak wavelength no less than 200 nm, or 250 nm, or 300 nm, or 400 nm, or 500 nm. In an embodiment, the second material comprises carbon, nickel oxide, nickel, silver, copper, CGO, NiO—YSZ, LSCF, LSM, ferritic steels, or combinations thereof. In some cases, the ferritic steel is Crofer 22 APU. In an embodiment, the first material comprises YSZ, CGO, NiO—YSZ, or LSM-YSZ. In an embodiment, the second material comprises LSCF, LSM, carbon, nickel oxide, nickel, silver, copper, or steel. In an embodiment, carbon comprises graphite, graphene, carbon nanoparticles, nano diamonds, or combinations thereof.

In an embodiment, said depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof.

In an embodiment, the method comprises controlling distance from the EMR to the substrate, EMR energy density, EMR spectrum, EMR voltage, EMR exposure duration, EMR exposure area, EMR exposure volume, EMR burst frequency, EMR exposure repetition number, or combinations thereof. In an embodiment, the object does not change location between depositing and heating. In an embodiment, the EMR has a power output of no less than 1 W, or 10 W, or 100 W, or 1000 W.

Herein also disclosed is a system comprising at least one deposition nozzle, an electromagnetic radiation (EMR) source, and a deposition receiver, wherein the deposition receiver is configured to receive EMR exposure and deposition at the same location. In some cases, the receiver is configured such that it receives deposition for a first time period, moves to a different location in the system to receive EMR exposure for a second time period.

The following detailed discussion takes the production of solid oxide fuel cells (SOFCs) as an example. As one in the art recognizes, the methodology and the manufacturing process are applicable to all fuel cell types. As such, the production of all fuel cell types is within the scope of this disclosure.

Additive Manufacturing

Additive manufacturing (AM) refers to a group of techniques that join materials to make objects, usually slice by slice or layer upon layer. AM is contrasted to subtractive manufacturing methodologies, which involve removing sections of a material by machining or cutting away. AM is also referred as additive fabrication, additive processes, additive techniques, additive layer manufacturing, layer manufacturing, and freeform fabrication. Some examples of AM are extrusion, photopolymerization, powder bed fusion, material jetting, binder jetting, directed energy deposition, lamination, direct metal laser sintering (DMLS), selective laser sintering (SLS), selective laser melting (SLM), directed energy deposition (DED), laser metal deposition (LMD), electron beam (EBAM), and metal binder jetting. A 3D printer is a type of AM machine (AMM). An inkjet printer or ultrasonic inkjet printer are also AMM's.

In a first aspect, the invention is a method of making a fuel cell comprising (a) producing an anode using an additive manufacturing machine (AMM); (b) creating an electrolyte using the AMM; and (c) making a cathode using the AMM. In an embodiment, the anode, the electrolyte, and the cathode are assembled into a fuel cell utilizing the AMM. In an embodiment, the fuel cell is formed using only the AMM. In an embodiment, steps (a), (b), and (c) exclude tape casting and exclude screen printing. In an embodiment, the method excludes compression in assembling. In an embodiment, the layers are deposited one on top of another and as such assembling is accomplished at the same time as deposition. The method of this disclosure is useful in making planar fuel cells. The method of this disclosure is useful in making fuel cells, wherein electrical current flow is perpendicular to the electrolyte in the lateral direction when the fuel cell is in use.

In an embodiment, the interconnect, the anode, the electrolyte, and the cathode are formed layer on layer, for example, printed layer on layer. It is important to note that, within the scope of the invention, the order of forming these layers can be varied. In other words, either the anode or the cathode can be formed before the other. Naturally, the electrolyte is formed so that it is between the anode and the cathode. The barrier layer(s), catalyst layer(s) and interconnect(s) are formed so as to lie in the appropriate position within the fuel cell to perform their functions.

In an embodiment, each of the interconnect, the anode, the electrolyte, and the cathode has six faces. In some cases, the anode is printed on the interconnect and is in contact with the interconnect; the electrolyte is printed on the anode and is in contact with the anode; the cathode is printed on the electrolyte and is in contact with the electrolyte. Each print is sintered, for example, using EMR. As such, the assembling process and the forming process are simultaneous, which is not possible with conventional methods. Moreover, with the preferred embodiment, the needed electrical contact and gas tightness are also achieved at the same time. In contrast, conventional fuel cell assembling processes accomplish this via pressing or compression of the fuel cell components or layers. The pressing or compression process can cause cracks in the fuel cell layers that are undesirable.

In an embodiment, the method comprises making at least one barrier layer using the AMM. In an embodiment, the at least one barrier layer is used between the electrolyte and the cathode or between the electrolyte and the anode or both. In an embodiment, the at least one barrier layer is assembled with the anode, the electrolyte, and the cathode using the AMM. In an embodiment, no barrier layer is utilized in the fuel cell.

In an embodiment, the method comprises making an interconnect using the AMM. In an embodiment, the interconnect is assembled with the anode, the electrolyte, and the cathode using the AMM. In an embodiment, the AMM forms a catalyst and incorporates said catalyst into the fuel cell.

In an embodiment, the anode, the electrolyte, the cathode, and the interconnect are made at a temperature above 100° C. In an embodiment, the method comprises heating the fuel cell, wherein said fuel cell comprises the anode, the electrolyte, the cathode, the interconnect, and optionally at least one barrier layer. In an embodiment, the fuel cell comprises a catalyst. In an embodiment, the method comprises heating the fuel cell to a temperature above 500° C. In an embodiment, the fuel cell is heated using EMR or oven curing.

In an embodiment, the AMM utilizes a multi-nozzle additive manufacturing method. In an embodiment, the multi-nozzle additive manufacturing method comprises nanoparticle jetting. In an embodiment, a first nozzle delivers a first material. In an embodiment, a second nozzle delivers a second material. In an embodiment, a third nozzle delivers a third material. In an embodiment, particles of a fourth material are placed in contact with a partially constructed fuel cell and bonded to the partially constructed fuel cell using a laser, photoelectric effect, light, heat, polymerization, or binding. In an embodiment, the anode, or the cathode, or the electrolyte comprises a first, second, third, or fourth material. In an embodiment, the AMM performs multiple additive manufacturing techniques. In various embodiments, the additive manufacturing techniques comprise extrusion, photopolymerization, powder bed fusion, material jetting, binder jetting, directed energy deposition, lamination. In various embodiments, additive manufacturing is a deposition technique comprising material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof.

Further discussed herein is a method of making a fuel cell stack comprising (a) producing an anode using an additive manufacturing machine (AMM); (b) creating an electrolyte using the AMM; (c) making a cathode using the AMM; (d) making an interconnect using the AMM; wherein the anode, the electrolyte, the cathode, and the interconnect form a first fuel cell; (e) repeating steps (a)-(d) to make a second fuel cell; and (f) assembling the first fuel cell and the second fuel cell into a fuel cell stack.

In an embodiment, the first fuel cell and the second fuel cell are formed from the anode, the electrolyte, the cathode, and the interconnect utilizing the AMM. In an embodiment, the fuel cell stack is formed using only the AMM. In an embodiment, steps (a)-(f) exclude tape casting and exclude screen printing.

In an embodiment, the method comprises making at least one barrier layer using the AMM. In an embodiment, the at least one barrier layer is used between the electrolyte and the cathode or between the electrolyte and the anode or both for the first fuel cell and the second fuel cell.

In an embodiment, steps (a)-(d) are performed at a temperature above 100° C. In an embodiment, steps (a)-(d) are performed at a temperature from 100° C. to 500° C. In an embodiment, the AMM makes a catalyst and incorporates said catalyst into the fuel cell stack.

In an embodiment, the method comprises heating the fuel cell stack. In an embodiment, the method comprises heating the fuel cell stack to a temperature above 500° C. In an embodiment, the fuel cell stack is heated using EMR and/or oven curing. In an embodiment, the laser has a laser beam, wherein said laser beam is expanded to create a heating zone with uniform power density. In an embodiment, the laser beam is expanded by the use of one or more mirrors. In an embodiment, each layer of the fuel cell is EMR cured separately. In an embodiment, a combination of fuel cell layers is EMR cured together. In an embodiment, the first fuel cell is EMR cured, assembled with the second fuel cell, and then the second fuel cell is EMR cured. In an embodiment, the first fuel cell is assembled with the second fuel cell, and then the first fuel cell and the second fuel cell are EMR cured separately. In an embodiment, the first fuel cell and the second fuel cell are EMR cured separately, and then the first fuel cell is assembled with the second fuel cell to form a fuel cell stack. In an embodiment, the first fuel cell is assembled with the second fuel cell to form a fuel cell stack, and then the fuel cell stack is EMR cured.

Also discussed herein is a method of making a multiplicity of fuel cells comprising (a) producing a multiplicity of anodes simultaneously using an additive manufacturing machine (AMM); (b) creating a multiplicity of electrolytes using the AMM simultaneously; and (c) making a multiplicity of cathodes using the AMM simultaneously. In an embodiment, the anodes, the electrolytes, and the cathodes are assembled into fuel cells utilizing the AMM simultaneously. In an embodiment, the fuel cells are formed using only the AMM.

In an embodiment, the method comprises making at least one barrier layer using the AMM for each of the multiplicity of fuel cells simultaneously. In an embodiment, said at least one barrier layer is used between the electrolyte and the cathode or between the electrolyte and the anode or both. In an embodiment, said at least one barrier layer is assembled with the anode, the electrolyte, and the cathode using the AMM for each fuel cell.

In an embodiment, the method comprises making an interconnect using the AMM for each of the multiplicity of fuel cells simultaneously. In an embodiment, said interconnect is assembled with the anode, the electrolyte, and the cathode using the AMM for each fuel cell. In an embodiment, the AMM forms a catalyst for each of the multiplicity of fuel cells simultaneously and incorporates said catalyst into each of the fuel cells. In an embodiment, heating of each layer or heating of a combination of layers of the multiplicity of fuel cells takes place simultaneously. In an embodiment, the multiplicity of fuel cells is 20 fuel cells or more.

In an embodiment, the AMM uses different nozzles to jet/print different materials at the same time. For example, in an AMM, a first nozzle makes an anode for fuel cell 1, a second nozzle makes a cathode for fuel cell 2, and a third nozzle makes an electrolyte for fuel cell 3, at the same time. For example, in an AMM, a first nozzle makes an anode for fuel cell 1, a second nozzle makes a cathode for fuel cell 2, a third nozzle makes an electrolyte for fuel cell 3, and a fourth nozzle makes an interconnect for fuel cell 4, at the same time.

Disclosed herein is an additive manufacturing machine (AMM) comprising a chamber, wherein manufacturing of fuel cells takes place, wherein said chamber is able to withstand a temperature of at least 300° C. In an embodiment, said chamber enables production of the fuel cells. In an embodiment, said chamber enables heating of the fuel cells in situ, meaning that the fuel cells are heated in the same machine, and preferably in the same location in that machine as the components of the fuel cell were deposited.

In an embodiment, said chamber is heated by laser, or electromagnetic waves/electromagnetic radiation (EMR), or hot fluid, or heating element associated with the chamber, or combinations thereof. In an embodiment, said heating element comprises a heating surface or a heating coil or a heating rod. In an embodiment, said chamber is configured to apply pressure to the fuel cells inside. In an embodiment, the pressure is applied via a moving element associated with the chamber. In an embodiment, said moving element is a moving stamp or plunger. In an embodiment, said chamber is configured to withstand pressure. In an embodiment, said chamber is configured to be pressurized by a fluid or de-pressurized. In an embodiment, said fluid in the chamber is changed or replaced.

In some cases, the chamber is enclosed. In some cases, the chamber is sealed. In some cases, the chamber is open. In some cases, the chamber is a platform without top and side walls.

Referring to FIG. 6, 601 represents deposition nozzles or material jetting nozzles; 602 represents EMR source, e.g., xenon lamp; 603 represents object being formed; and 604 represents chamber as a part of an AMM. As illustrated in FIG. 6, the chamber or receiver 604 is configured to receive both deposition from nozzles and radiation from an EMR source. In various embodiments, deposition nozzles 601 are movable. In various embodiments, the chamber or receiver 604 is movable. In various embodiments, the EMR source 602 is movable. In various embodiments, the object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel, or combinations thereof.

Additive Manufacturing techniques suitable for this disclosure comprise extrusion, photopolymerization, powder bed fusion, material jetting, binder jetting, directed energy deposition, and lamination. In an embodiment, Additive Manufacturing is extrusion additive manufacturing. Extrusion additive manufacturing involves the spatially controlled deposition of material (e.g., thermoplastics). It is also referred to as fused filament fabrication (FFF) or fused deposition modeling (FDM) in this disclosure.

In an embodiment, Additive Manufacturing is photopolymerization, i.e., stereolithography (SLA) for the process of this disclosure. SLA involves spatially-defined curing of a photoactive liquid (a "photoresin"), using a scanning laser or a high-resolution projected image, transforming it into a crosslinked solid. Photopolymerization produces parts with details and dimensions ranging from the micrometer- to meter-scales.

In an embodiment, Additive Manufacturing is Powder bed fusion (PBF). PBF AM processes build objects by melting powdered feedstock, such as a polymer or metal. PBF processes begin by spreading a thin layer of powder across the build area. Cross sections are then melted a layer at a time, most often using a laser, electron beam, or intense infrared lamps. In an embodiment, PBF of metals is selective laser melting (SLM) or electron beam melting (EBM). In an embodiment, PBF of polymers is selective laser sintering (SLS). In various embodiments, SLS systems print thermoplastic polymer materials, polymer composites, or ceramics. In various embodiments, SLM systems are suitable for a variety of pure metals and alloys, wherein the alloys are compatible with the rapid solidification that occurs in SLM.

In an embodiment, Additive Manufacturing is material jetting. Additive manufacturing by material jetting is accomplished by depositing small drops (or droplets) of material, with spatial control. In various embodiments, material jetting is performed three dimensionally (3D) or two dimensionally (2D) or both. In an embodiment, 3D jetting is accomplished layer by layer. In an embodiment, print preparation converts the computer-aided design (CAD), along with specifications of material composition, color, and other variables to the printing instructions for each layer. Binder jetting AM involves inkjet deposition of a liquid binder onto a powder bed. In some cases, binder jetting combines physics of other AM processes: spreading of powder to make the powder bed (analogous to SLS/SLM), and inkjet printing.

In an embodiment, Additive Manufacturing is directed energy deposition (DED). Instead of using a powder bed as discussed above, the DED process uses a directed flow of powder or a wire feed, along with an energy intensive source such as laser, electric arc, or electron beam. In an embodiment, DED is a direct-write process, wherein the location of material deposition is determined by movement of the deposition head, which allows large metal structures to be built without the constraints of a powder bed.

In an embodiment, Additive Manufacturing is Lamination AM, or Laminated Object Manufacturing (LOM). In an embodiment, consecutive layers of sheet material are consecutively bonded and cut in order to form a 3D structure.

Contrary to traditional methods of manufacturing a fuel cell stack, which can comprise over 100 steps, including but not limited to milling, grinding, filtering, analyzing, mixing, binding, evaporating, aging, drying, extruding, spreading, tape casting, screen printing, stacking, heating, pressing, sintering, and compressing, the method of this disclosure manufactures a fuel cell or a fuel cell stack using one AMM.

The AMM of this disclosure preferably performs both extrusion and ink jetting to manufacture a fuel cell or fuel cell stack. Extrusion is used to manufacture thicker layers of a fuel cell, such as, the anode and/or the cathode. Ink jetting is used to manufacture thin layers of a fuel cell. Ink jetting is used to manufacture the electrolyte. The AMM operates at temperature ranges sufficient to enable curing in the AMM itself. Such temperature ranges are 100° C. or above, such as 100° C.-300° C. or 100° C.-500° C.

As an example, all the layers of a fuel cell are formed and assembled via printing. The material for making the anode, the cathode, the electrolyte, and the interconnect, respectively, is made into an ink form comprising a solvent and particles (e.g., nanoparticles). There are two categories of ink formulations—aqueous inks and non-aqueous inks. In some cases, the aqueous ink comprises an aqueous solvent (e.g., water, deionized water), particles, a dispersant, and a surfactant. In some cases, the aqueous ink comprises an aqueous solvent (e.g., water, deionized water), particles, a dispersant, a surfactant, but no polymeric binder. The aqueous ink optionally comprises a co-solvent, such as an organic miscible solvent (methanol, ethanol, isopropyl alcohol). Such co-solvents preferably have a lower boiling point than water. The dispersant is an electrostatic dispersant, a steric dispersant, an ionic dispersant, a non-ionic dispersant, or a combination thereof. The surfactant is preferably non-ionic, such as an alcohol alkoxylate, an alcohol ethoxylate. The non-aqueous ink comprises an organic solvent (e.g., methanol, ethanol, isopropyl alcohol, butanol) and particles.

For example, CGO powder is mixed with water to form an aqueous ink with a dispersant added and a surfactant added but with no polymeric binder added. The CGO fraction based on mass is in the range of from 10 wt % to 25 wt %. For example, CGO powder is mixed with ethanol to form a non-aqueous ink with polyvinyl butaryl added. The CGO fraction based on mass is in the range of from 3 wt % to 30 wt %. For example, LSCF is mixed with n-butanol or ethanol to form a non-aqueous ink with polyvinyl butaryl added. The LSCF fraction based on mass is in the range of from 10 wt % to 40 wt %. For example, YSZ particles are mixed with water to form an aqueous ink with a dispersant added and a surfactant added but with no polymeric binder added. The YSZ fraction based on mass is in the range of from 3 wt % to 40 wt %. For example, NiO particles are mixed with water to form an aqueous ink with a dispersant added and a surfactant added but with no polymeric binder added. The NiO fraction based on mass is in the range of from 5 wt % to 25 wt %.

As an example, for the cathode of a fuel cell, LSCF or LSM particles are dissolved in a solvent, wherein the solvent is water or an alcohol (e.g., butanol) or a mixture of alcohols. Organic solvents other than alcohols may also be used. As an example, LSCF is deposited (e.g., printed) into a layer. A xenon lamp irradiates the LSCF layer with EMR to sinter the LSCF. The flash lamp is a 10 kW unit applied at a voltage of 400V and a frequency of 10 Hz for a total exposure duration of 1000 ms.

For example, for the electrolyte, YSZ particles are mixed with a solvent, wherein the solvent is water (e.g., de-ionized water) (e.g., de-ionized water) or an alcohol (e.g., butanol) or a mixture of alcohols. Organic solvents other than alcohols may also be used. For the interconnect, metallic particles (such as, silver nanoparticles) are dissolved in a solvent, wherein the solvent may include water (e.g., de-ionized water), organic solvents (e.g. mono-, di-, or tri-ethylene glycols or higher ethylene glycols, propylene glycol, 1,4-butanediol or ethers of such glycols, thiodiglycol, glycerol and ethers and esters thereof, polyglycerol, mono-, di-, and tri-ethanolamine, propanolamine, N,N-dimethylformamide, dimethyl sulfoxide, dimethylacetamide, N-methylpyrrolidone, 1,3-dimethylimidazolidone, methanol, ethanol, isopropanol, n-propanol, diacetone alcohol, acetone, methyl ethyl ketone, propylene carbonate), and combinations thereof. For a barrier layer in a fuel cell, CGO particles are dissolved in a solvent, wherein the solvent is water (e.g., de-ionized water) or an alcohol (e.g., butanol) or a mixture of alcohols. Organic solvents other than alcohols may also be used. CGO is used as barrier layer for LSCF. YSZ may also be used as a barrier layer for LSM. In some cases, for the aqueous inks where water is the solvent, no polymeric binder is added to the aqueous inks.

The manufacturing process of a fuel cell sometimes comprises more than 100 steps utilizing dozens of machines. According to an embodiment of this disclosure, a method of making a fuel cell comprises using only one additive manufacturing machine (AMM) to manufacture a fuel cell, wherein the fuel cell comprises an anode, electrolyte, and a cathode. In an embodiment, the fuel cell comprises at least one barrier layer, for example, between the electrolyte and the cathode, or between the electrolyte and the cathode, or both. The at least one barrier layer is also made by the same single AMM. In an embodiment, the AMM also produces an interconnect and assembles the interconnect with the anode, the cathode, the barrier layer(s), and the electrolyte. Such manufacturing method and system are applicable not only to making fuel cells but also for making any electrochemical device. The following discussion takes fuel cell as an example, but any reactor or catalyst is within the scope of this disclosure.

In various embodiments, the single AMM makes a first fuel cell, wherein the fuel cell comprises the anode, the electrolyte, the cathode, the at least one barrier layer, and the interconnect. In various embodiments, the single AMM makes a second fuel cell. In various embodiments, the single AMM assembles the first fuel cell with the second fuel cell to form a fuel cell stack. In various embodiments, the production using AMM is repeated as many times as desired; and a fuel cell stack is assembled using the AMM. In an embodiment, the various layers of the fuel cell are produced by the AMM above ambient temperature, for example, above 100° C., from 100° C. to 500° C., from 100° C. to 300° C. In various embodiments, the fuel cell or fuel cell stack is heated after it is formed/assembled. In an embodiment, the fuel cell or fuel cell stack is heated at a temperature above 500° C. In an embodiment, the fuel cell or fuel cell stack is heated at a temperature from 500° C. to 1500° C.

In various embodiments, the AMM comprises a chamber where the manufacturing of fuel cells takes place. This chamber is able to withstand high temperature to enable the production of the fuel cells. In an embodiment, this high temperature is at least 300° C. In an embodiment, this high temperature is at least 500° C. In an embodiment, this high temperature is at least 1000° C. In an embodiment, this high temperature is at least 1500° C. In some cases, this chamber also enables heating of the fuel cells to take place in the chamber. Various heating methods are applied, such as laser heating/curing, electromagnetic wave heating, hot fluid heating, or heating element associated with the chamber. The heating element may be a heating surface or a heating coil or a heating rod and is associated with the chamber such that the content in the chamber is heated to the desired temperature range. In various embodiments, the chamber of the AMM is able to apply pressure to the fuel cell(s) inside, for example, via a moving element (e.g., a moving stamp or plunger). In various embodiments, the chamber of the AMM is able to withstand pressure. The chamber can be pressurized by a fluid and de-pressurized as desired. The fluid in the chamber can also be changed/replaced as needed.

In an embodiment, the fuel cell or fuel cell stack is heated using EMR. In an embodiment, the fuel cell or fuel cell stack is heated using oven curing. In an embodiment, the laser beam is expanded (for example, by the use of one or more mirrors) to create a heating zone with uniform power density. In an embodiment, each layer of the fuel cell is EMR cured separately. In an embodiment, a combination of fuel cell layers is EMR cured separately, for example, a combination of the anode, the electrolyte, and the cathode layers. In an embodiment, a first fuel cell is EMR cured, assembled with a second fuel cell, and then the second fuel cell is EMR cured. In an embodiment, a first fuel cell is assembled with a second fuel cell, and then the first fuel cell and the second fuel cell are EMR cured separately. In an embodiment, a first fuel cell is assembled with a second fuel cell to form a fuel cell stack, and then the fuel cell stack is EMR cured. The sequence of laser heating/curing and assembling is applicable to all other heating methods.

In an embodiment, the AMM produces each layer of a multiplicity of fuel cells simultaneously. In an embodiment, the AMM assembles each layer of a multiplicity of fuel cells simultaneously. In an embodiment, heating of each layer or heating of a combination of layers of a multiplicity of fuel cells takes place simultaneously. All the discussion and all the features herein for a fuel cell or a fuel cell stack are applicable to the production, assembling, and heating of the multiplicity of fuel cells. In an embodiment, a multiplicity of fuel cells is 20 or more. In an embodiment, a multiplicity of fuel cells is 50 or more. In an embodiment, a multiplicity of fuel cells is 80 or more. In an embodiment, a multiplicity of fuel cells is 100 or more. In an embodiment, a multiplicity of fuel cells is 500 or more. In an embodiment, a multiplicity of fuel cells is 800 or more. In an embodiment, a multiplicity of fuel cells is 1000 or more. In an embodiment, a multiplicity of fuel cells is 5000 or more. In an embodiment, a multiplicity of fuel cells is 10,000 or more.

Treatment Process

Herein disclosed is a treatment process that has one or more of the following effects: heating, drying, curing, sintering, annealing, sealing, alloying, evaporating, restructuring, foaming, with sintering being preferred. The treatment process comprises exposing a substrate to a source of electromagnetic radiation (EMR). In an embodiment, the EMR treats a substrate having a first material. In various embodiments, the EMR has a peak wavelength ranging from 10 to 1500 nm. In various embodiments, the EMR has a minimum energy density of 0.1 Joule/cm$^2$. In an embodiment, the EMR has a burst frequency of $10^{-4}$-1000 Hz or 1-1000 Hz or 10-1000 Hz. In an embodiment, the EMR has an exposure distance of no greater than 50 mm. In an embodiment, the EMR has an exposure duration no less than 0.1 ms or 1 ms. In an embodiment, the EMR is applied with a capacitor voltage of no less than 100V. For example, a single pulse of EMR is applied with an exposure distance of about 10 mm and an exposure duration of 5-20 ms. For example, multiple pulses of EMR are applied at a burst frequency of 100 Hz with an exposure distance of about 10 mm and an exposure duration of 5-20 ms. In an embodiment, the EMR consists of one exposure. In an embodiment, the EMR comprises no greater than 10 exposures, or no greater than 100 exposures, or no greater than 1000 exposures, or no greater than 10,000 exposures.

In various embodiments, metals and ceramics are sintered almost instantly (milliseconds for <<10 microns) using pulsed light. The sintering temperature is controlled to be in the range of from 100° C. to 2000° C. The sintering temperature is tailored as a function of depth. In one case, the surface temperature is 1000° C. and the sub-surface is kept at 100° C., wherein the sub-surface is 100 microns below the surface. In an embodiment, the material suitable for this treatment process includes Yttria-stabilized zirconia (YSZ), 8YSZ (8 mol % YSZ powder), Yttirum, Zirconium, gadolinia-doped ceria (GDC or CGO), Samaria-doped ceria (SDC), Scandia-stabilized zirconia (SSZ), Lanthanum strontium manganite (LSM), Lanthanum Strontium Cobalt Ferrite (LSCF), Lanthanum Strontium Cobaltite (LSC), Lanthanum Strontium Gallium Magnesium Oxide (LSGM), Nickel, NiO, NiO—YSZ, Cu—CGO, $Cu_2O$, CuO, Cerium, copper, silver, crofer, steel, lanthanum chromite, doped lanthanum chromite, ferritic steel, stainless steel, or combinations thereof.

This treatment process is applicable in the manufacturing process of a fuel cell. In an embodiment, a layer of a fuel cell (anode, cathode, electrolyte, seal, catalyst) is treated using the process of this disclosure to be heated, cured, sintered, sealed, alloyed, foamed, evaporated, restructured, dried, or annealed. In an embodiment, a portion of a layer of a fuel cell (anode, cathode, electrolyte, seal, catalyst) is treated using the process of this disclosure to be heated, cured, sintered, sealed, alloyed, foamed, evaporated, restructured, dried, or annealed. In an embodiment, a combination of layers of a fuel cell (anode, cathode, electrolyte, seal, catalyst) is treated using the process of this disclosure to be heated, cured, sintered, sealed, alloyed, foamed, evaporated, restructured, dried, or annealed, wherein the layers may be a complete layer or a partial layer.

The treatment process of this disclosure is preferably rapid, with the treatment duration varied from microseconds to milliseconds. The treatment duration is accurately controlled. The treatment process of this disclosure produces fuel cell layers that have no crack or have minimal cracking. The treatment process of this disclosure controls the power density or energy density in the treatment volume of the material being treated. The treatment volume is accurately controlled. In an embodiment, the treatment process of this disclosure provides the same energy density or different energy densities in a treatment volume. In an embodiment, the treatment process of this disclosure provides the same treatment duration or different treatment durations in a treatment volume. In an embodiment, the treatment process of this disclosure provides simultaneous treatment for one or more treatment volumes. In an embodiment, the treatment process of this disclosure provides simultaneous treatment for one or more fuel cell layers or partial layers or combination of layers. In an embodiment, the treatment volume is varied by changing the treatment depth.

In an embodiment, a first portion of a treatment volume is treated by electromagnetic radiation of a first wavelength; a second portion of the treatment volume is treated by electromagnetic radiation of a second wavelength. In some cases, the first wavelength is the same as the second wavelength. In some cases, the first wavelength is different from the second wavelength. In an embodiment, the first portion of a treatment volume has a different energy density from the second portion of the treatment volume. In an embodiment, the first portion of a treatment volume has a different treatment duration from the second portion of the treatment volume.

In an embodiment, the EMR has a broad emission spectrum so that the desired effects are achieved for a wide range of materials having different absorption characteristics. In this disclosure, absorption of electromagnetic radiation (EMR) refers to the process, wherein the energy of a photon is taken up by matter, such as the electrons of an atom. Thus, the electromagnetic energy is transformed into internal energy of the absorber, for example, thermal energy. For example, the EMR spectrum extends from the deep ultraviolet (UV) range to the near infrared (IR) range, with peak pulse powers at 220 nm wavelength. The power of such EMR is on the order of Megawatts. Such EMR sources perform tasks such as breaking chemical bonds, sintering, ablating or sterilizing.

In an embodiment, the EMR has an energy density of no less than 0.1, 1, or 10 Joule/cm$^2$. In an embodiment, the EMR has a power output of no less than 1 watt (W), 10 W, 100 W, 1000 W. The EMR delivers power to the substrate of no less than 1 W, 10 W, 100 W, 1000 W. In an embodiment, such EMR exposure heats the material in the substrate. In an embodiment, the EMR has a range or a spectrum of different wavelengths. In various embodiments, the treated substrate is at least a portion of an anode, cathode, electrolyte, catalyst, barrier layer, or interconnect of a fuel cell.

In an embodiment, the peak wavelength of the EMR is between 50 and 550 nm or between 100 and 300 nm. In an embodiment, the absorption of at least a portion of the substrate for at least one frequency of the EMR between 10 and 1500 nm is no less than 30% or no less than 50%. In an embodiment, the absorption of at least a portion of the substrate for at least one frequency between 50 and 550 nm is no less than 30% or no less than 50%. In an embodiment, the absorption of at least a portion of the substrate for at least one frequency between 100 and 300 nm is no less than 30% or no less than 50%.

Sintering is the process of compacting and forming a solid mass of material by heat or pressure without melting it to the point of liquefaction. In this disclosure, the substrate under EMR exposure is sintered but not melted. In an embodiment, the EMR is UV light, near ultraviolet light, near infrared light, infrared light, visible light, laser, electron beam, microwave. In an embodiment, the substrate is exposed to the EMR for no less than 1 microsecond, no less than 1 millisecond. In an embodiment, the substrate is exposed to the EMR for less than 1 second at a time or less than 10 seconds at a time. In an embodiment, the substrate is exposed to the EMR for less than 1 second or less than 10 seconds. In an embodiment, the substrate is exposed to the EMR repeatedly, for example, more than 1 time, more than 3 times, more than 10 times. In an embodiment, the substrate is distanced from the source of the EMR for less than 50 cm, less than 10 cm, less than 1 cm, or less than 1 mm.

In an embodiment, after EMR exposure a second material is added to or placed on to the first material. In various cases, the second material is the same as the first material. In an embodiment, the second material is exposed to the EMR. In some cases, a third material is added. In an embodiment, the third material is exposed to the EMR.

In an embodiment, the first material comprises YSZ, 8YSZ, Yttirum, Zirconium, GDC, SDC, LSM, LSCF, LSC, Nickel, NiO, Cerium. In an embodiment, the second material comprises graphite. In an embodiment, the electrolyte, anode, or cathode comprises a second material. In some cases, the volume fraction of the second material in the electrolyte, anode, or cathode is less than 20%, 10%, 3%, or 1%. The absorption rate of the second material for at least one frequency (e.g., between 10 and 1500 nm or between 100 and 300 nm or between 50 and 550 nm) is greater than 30% or greater than 50%.

In various embodiments, one or a combination of parameters are controlled, wherein such parameters include distance between the EMR source and the substrate, the energy density of the EMR, the spectrum of the EMR, the voltage of the EMR, the duration of exposure, the burst frequency, and the number of EMR exposures. Preferably, these parameters are controlled to minimize the formation of cracks in the substrate.

In an embodiment, the EMR energy is delivered to a surface area of no less than 1 mm$^2$, or no less than 1 cm$^2$, or no less than 10 cm$^2$, or no less than 100 cm$^2$. In some cases, during EMR exposure of the first material, at least a portion of an adjacent material is heated at least in part by conduction of heat from the first material. In various embodiments, the layers of the fuel cell (e.g., anode, cathode, electrolyte) are thin. Preferably they are no greater than 30 microns, no greater than 10 microns, or no greater than 1 micron.

In an embodiment, the first material of the substrate is in the form of a powder, sol gel, colloidal suspension, hybrid solution, or sintered material. In various embodiments, the second material may be added by vapor deposition. In an embodiment, the second material coats the first material. In an embodiment, the second material reacts with light, e.g. focused light, as by a laser and sintera or anneala with the first material.

Advantages.

The preferred treatment process of this disclosure enables rapid manufacturing of fuel cells by eliminating traditional, costly, time consuming, expensive sintering processes and replacing them with rapid, in-situ methods that allow continuous manufacturing of the layers of a fuel cell in a single machine if desired. This process also shortens sintering time from hours and days to seconds or milliseconds or even microseconds.

In various embodiments, this treatment method is used in combination with manufacturing techniques like screen printing, tape casting, spraying, sputtering, physical vapor deposition, and additive manufacturing.

This preferred treatment method enables tailored and controlled heating by tuning EMR characteristics (such as, wavelengths, energy density, burst frequency, and exposure duration) combined with controlling thicknesses of the layers of the substrate and heat conduction into adjacent layers to allow each layer to sinter, anneal, or cure at each desired target temperature. This process enables more uniform energy application, decreases or eliminates cracking, which improves electrolyte performance. The substrate treated with this preferred process also has less thermal stress due to more uniform heating.

Fuel Cell

A fuel cell is an electrochemical apparatus that converts the chemical energy from a fuel into electricity through an electrochemical reaction. As mentioned above, there are many types of fuel cells, e.g., proton-exchange membrane fuel cells (PEMFCs), solid oxide fuel cells (SOFCs). A fuel cell typically comprises an anode, a cathode, an electrolyte, an interconnect, optionally a barrier layer and/or optionally a catalyst. Both the anode and the cathode are electrodes. The listings of material for the electrodes, the electrolyte, and the interconnect in a fuel cell are applicable in some cases to the EC gas producer and the EC compressor. These listings are only examples and not limiting. Furthermore, the designations of anode material and cathode material are also not limiting because the function of the material during operation (e.g., whether it is oxidizing or reducing) determines whether the material is used as an anode or a cathode.

FIGS. 1-5 illustrate various embodiments of the components in a fuel cell or a fuel cell stack. In these embodiments, the anode, cathode, electrolyte, and interconnect are cuboids or rectangular prisms.

Referring to FIG. 1, 101 schematically represents the anode; 102 represents the cathode; and 103 represents the electrolyte.

Figure 2:
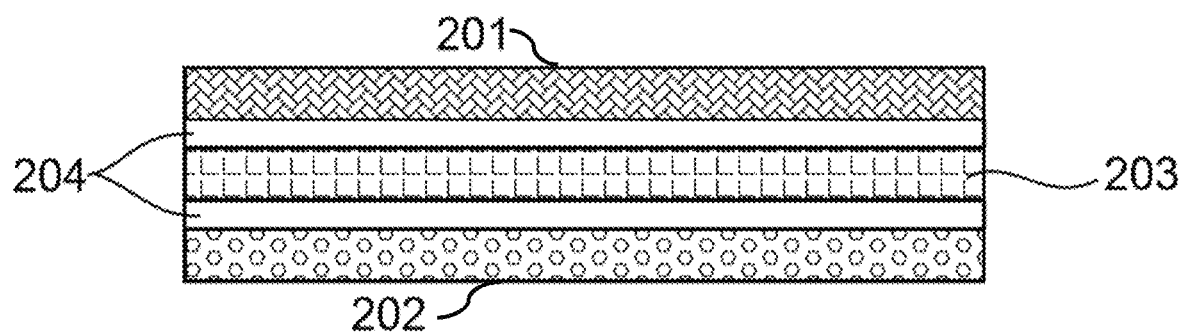
FIG. 2 illustrates a fuel cell comprising an anode, an electrolyte, at least one barrier layer, and a cathode, according to an embodiment of this disclosure.

Referring to FIG. 2, 201 schematically represents the anode; 202 represents the cathode; 203 represents the electrolyte; and 204 represents the barrier layers.

Figure 3:
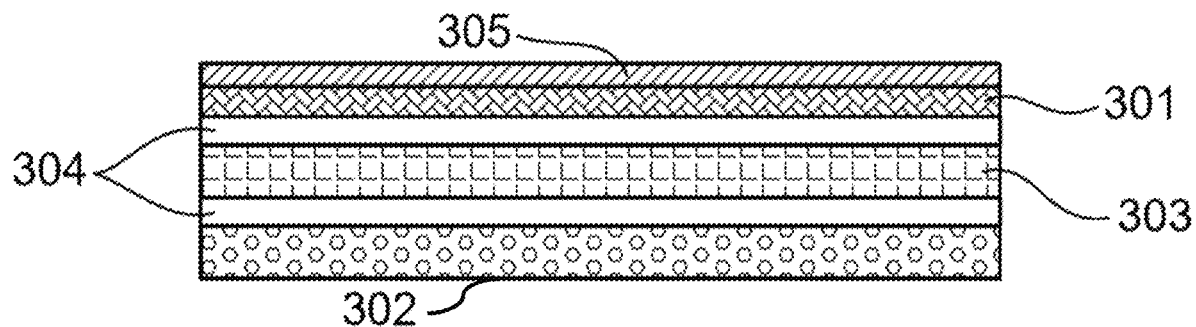
FIG. 3 illustrates a fuel cell comprising an anode, a catalyst, an electrolyte, at least one barrier layer, and a cathode, according to an embodiment of this disclosure.

Referring to FIG. 3, 301 schematically represents the anode; 302 represents the cathode; 303 represents the electrolyte; 304 represents the barrier layers; and 305 represents the catalyst.

Figure 4:
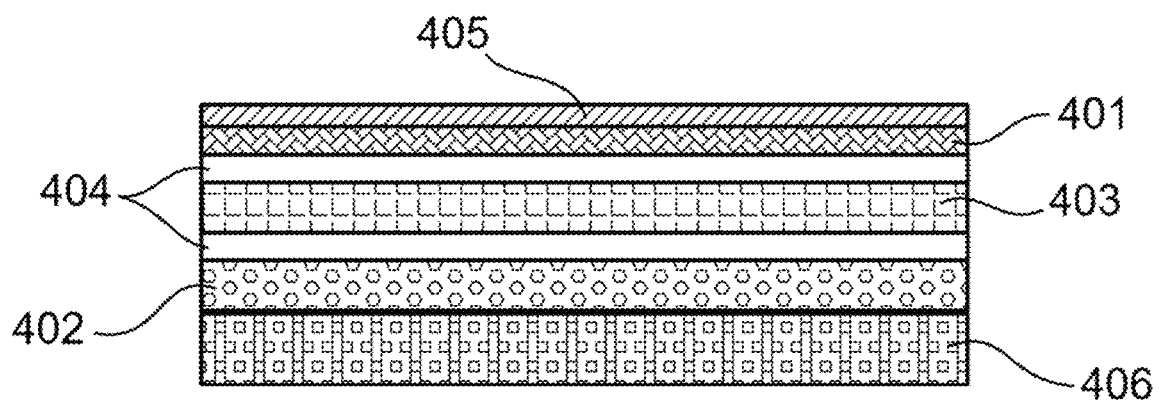
FIG. 4 illustrates a fuel cell comprising an anode, a catalyst, an electrolyte, at least one barrier layer, a cathode, and an interconnect, according to an embodiment of this disclosure.

Referring to FIG. 4, 401 schematically represents the anode; 402 represents the cathode; 403 represents the electrolyte; 404 represents then barrier layer; 405 represents the catalyst; and 406 represents the interconnect.

Figure 5:
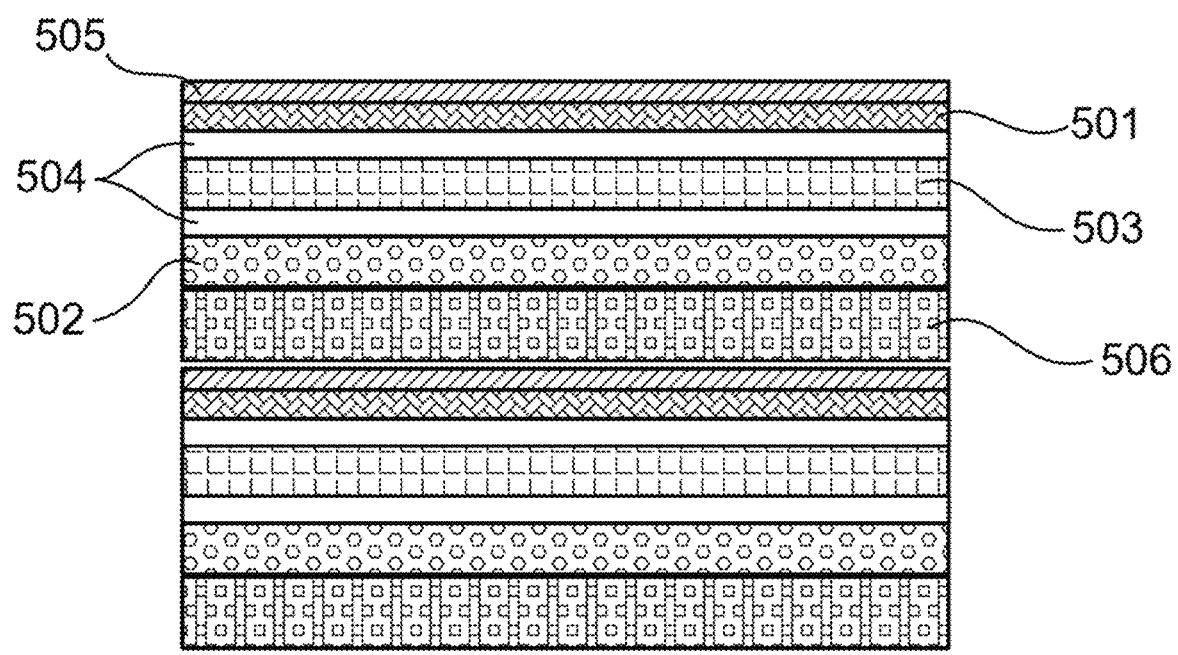
FIG. 5 illustrates a fuel cell stack, according to an embodiment of this disclosure.

FIG. 5 depicts two fuel cells in a fuel cell stack. Item 501 schematically represents the anode; 502 represents the cathode; 503 represents the electrolyte; 504 represents the barrier layers; 505 represents the catalyst; and 506 represents the interconnect. Two fuel cell repeat units or two fuel cells form a stack as illustrated. As is seen, on one side the interconnect is in contact with the largest surface of the cathode of the top fuel cell (or fuel cell repeat unit) and on the opposite side the interconnect is in contact with the largest surface of the catalyst (optional) or the anode of the bottom fuel cell (or fuel cell repeat unit). These repeat units or fuel cells are connected in parallel by being stacked atop one another and sharing an interconnect in between via direct contact with the interconnect rather than via electrical wiring. This kind of configuration is in contrast to segmented-in-series (SIS) type fuel cells.

Cathode

In an embodiment, the cathode comprises perovskites, such as LSC, LSCF, LSM. In an embodiment, the cathode comprises lanthanum, cobalt, strontium, manganite. In an embodiment, the cathode is porous. In an embodiment, the cathode comprises YSZ, Nitrogen, Nitrogen Boron doped Graphene, La0.6Sr0.4Co0.2Fe0.8O3, SrCo0.5Sc0.5O3, BaFe0.75Ta0.25O3, BaFe0.875Re0.125O3, Ba0.5La0.125Zn0.375NiO3, Ba0.75Sr0.25Fe0.875Ga0.125O3, BaFe0.125Co0.125, Zr0.75O3. In an embodiment, the cathode comprises LSCo, LCo, LSF, LSCoF. In an embodiment, the cathode comprises perovskites LaCoO3, LaFeO3, LaMnO3, (La,Sr)MnO3, LSM-GDC, LSCF-GDC, LSC-GDC. Cathodes containing LSCF are suitable for intermediate-temperature fuel cell operation.

In an embodiment, the cathode comprises a material selected from the group consisting of lanthanum strontium manganite, lanthanum strontium ferrite, and lanthanum strontium cobalt ferrite. In an embodiment, the cathode comprises lanthanum strontium manganite.

Anode

In an embodiment, the anode comprises Copper, Nickle-Oxide, Nickle-Oxide-YSZ, NiO-GDC, NiO—SDC, Aluminum doped Zinc Oxide, Molybdenum Oxide, Lanthanum, strontium, chromite, ceria, perovskites (such as, LSCF [La{1-x}Sr{x}Co{1-y}Fe{y}O3] or LSM [La{1-x}Sr{x}MnO3], where x is usually 0.15-0.2 and y is 0.7 to 0.8). In an embodiment, the anode comprises SDC or BZCYYb coating or barrier layer to reduce coking and sulfur poisoning. In an embodiment, the anode is porous. In an embodiment, the anode comprises combination of electrolyte material and electrochemically active material, combination of electrolyte material and electrically conductive material.

In an embodiment, the anode comprises nickel and yttria stabilized zirconia. In an embodiment, the anode is formed by reduction of a material comprising nickel oxide and yttria stabilized zirconia. In an embodiment, the anode comprises nickel and gadolinium stabilized ceria. In an embodiment, the anode is formed by reduction of a material comprising nickel oxide and gadolinium stabilized ceria.

Electrolyte

In an embodiment, the electrolyte in a fuel cell comprises stabilized zirconia e.g., YSZ, YSZ-8, Y0.16Zr0.84O2. In an embodiment, the electrolyte comprises doped LaGaO3, e.g., LSGM, La0.9Sr0.1Ga0.8Mg0.2O3. In an embodiment, the electrolyte comprises doped ceria, e.g., GDC, Gd0.2Ce0.8O2. In an embodiment, the electrolyte comprises stabilized bismuth oxide e.g., BVCO, Bi2V0.9Cu0.1O5.35.

In an embodiment, the electrolyte comprises zirconium oxide, yttria stabilized zirconium oxide (also known as YSZ, YSZ8 (8 mole % YSZ)), ceria, gadolinia, scandia, magnesia, calcia. In an embodiment, the electrolyte is sufficiently impermeable to prevent significant gas transport and prevent significant electrical conduction; and allow ion conductivity. In an embodiment, the electrolyte comprises doped oxide such as cerium oxide, yttrium oxide, bismuth oxide, lead oxide, lanthanum oxide. In an embodiment, the electrolyte comprises perovskite, such as, LaCoFeO3 or LaCoO3 or Ce0.9Gd0.1O2 (GDC) or Ce0.9Sm0.1O2 (SDC, samaria doped ceria) or scandia stabilized zirconia.

In an embodiment, the electrolyte comprises a material selected from the group consisting of zirconia, ceria, and gallia. In an embodiment, the material is stabilized with a stabilizing material selected from the group consisting of scandium, samarium, gadolinium, and yttrium. In an embodiment, the material comprises yttria stabilized zirconia.

Interconnect

In an embodiment, the interconnect comprises silver, gold, platinum, AISI441, ferritic stainless steel, stainless steel, Lanthanum, Chromium, Chromium Oxide, Chromite, Cobalt, Cesium, Cr2O3. In an embodiment, the anode comprises LaCrO3 coating on Cr2O3 or NiCo2O4 or MnCo2O4 coatings. In an embodiment, the interconnect surface is coated with Cobalt and/or Cesium. In an embodiment, the interconnect comprises ceramics. In an embodiment, the interconnect comprises Lanthanum Chromite or doped Lanthanum Chromite. In an embodiment, the interconnect is made of a material comprising metal, stainless steel, ferritic steel, crofer, lanthanum chromite, silver, metal alloys, nickel, nickel oxide, ceramics, or graphene.

Catalyst

In various embodiments, the fuel cell comprises a catalyst, such as, platinum, palladium, scandia, chromium, cobalt, cesium, CeO2, nickle, nickle oxide, zine, copper, titantia, ruthenium, rhodiu, MoS2, molybdenum, rhenium, vandia, manganese, magnesium, iron. In various embodiments, the catalyst promotes methane reforming reactions to generate hydrogen and carbon monoxide for them to be oxidized in the fuel cell. Very often, the catalyst is part of the anode, especially nickel anode has inherent methane reforming properties. In an embodiment, the catalyst is between 1%-5%, or 0.1% to 10% by mass. In an embodiment, the catalyst is used on the anode surface or in the anode. In various embodiments, such anode catalysts reduce harmful coking reactions and carbon deposits. In various embodiments, simple oxide version of catalysts is used or perovskite. For example, 2% mass CeO2 catalyst is used for methane-powered fuel cells. In various embodiments, the catalyst is dipped or coated on the anode. In various embodiments, the catalyst is made by an additive manufacturing machine (AMM) and incorporated into the fuel cell using the AMM.

The unique manufacturing methods as discussed herein have allowed the making of ultra-thin fuel cells and fuel cell stacks. Conventionally, to achieve structural integrity, the fuel cell has at least one thick layer per repeat unit, like the anode (an anode-supported fuel cell) or the interconnect (an interconnect-supported fuel cell). As discussed above, the pressing or compression step is typically necessary to assemble the fuel cell components to achieve gas tightness and/or proper electrical contact in traditional manufacturing processes. As such, the thick layers are necessary not only because traditional methods (like tape casting) cannot produce ultra-thin layers but also because the layers have to be thick to endure the pressing or compression step. The preferred manufacturing methods of this disclosure have eliminated the need for pressing or compression. The preferred manufacturing methods of this disclosure have also enabled the making of ultra-thin layers. The multiplicity of the layers in a fuel cell or a fuel cell stack provides sufficient structural integrity for proper operation when they are made according to this disclosure.

Herein disclosed is a fuel cell comprising an anode no greater than 1 mm or 500 microns or 300 microns or 100 microns or 50 microns or no greater than 25 microns in thickness, a cathode no greater than 1 mm or 500 microns or 300 microns or 100 microns or 50 microns or no greater than 25 microns in thickness, and an electrolyte no greater than 1 mm or 500 microns or 300 microns or 100 microns or 50 microns or 30 microns in thickness. In an embodiment, the fuel cell comprises an interconnect having a thickness of no less than 50 microns. In some cases, a fuel cell comprises an anode no greater than 25 microns in thickness, a cathode no greater than 25 microns in thickness, and an electrolyte no greater than 10 microns or 5 microns in thickness. In an embodiment, the fuel cell comprises an interconnect having a thickness of no less than 50 microns. In an embodiment, the interconnect has a thickness of from 50 microns to 5 cm.

In a preferred embodiment, a fuel cell comprises an anode no greater than 100 microns in thickness, a cathode no greater than 100 microns in thickness, an electrolyte no greater than 20 microns in thickness, and an interconnect no greater than 30 microns in thickness. In a more preferred embodiment, a fuel cell comprises an anode no greater than 50 microns in thickness, a cathode no greater than 50 microns in thickness, an electrolyte no greater than 10 microns in thickness, and an interconnect no greater than 25 microns in thickness. In an embodiment, the interconnect has a thickness in the range of from 1 micron to 20 microns.

In a preferred embodiment, the fuel cell comprises a barrier layer between the anode and the electrolyte, or a barrier layer between the cathode and the electrolyte, or both barrier layers. In some cases, the barrier layers are the interconnects. In such cases, the reactants are directly injected into the anode and the cathode.

In an embodiment, the cathode has a thickness of no greater than 15 microns, or no greater than 10 microns, or no greater than 5 microns. In an embodiment, the anode has a thickness of no greater than 15 microns, or no greater than 10 microns, or no greater than 5 microns. In an embodiment, the electrolyte has a thickness of no greater than 5 microns, or no greater than 2 microns, or no greater than 1 micron, or no greater than 0.5 micron. In an embodiment, the interconnect is made of a material comprising metal, stainless steel, silver, metal alloys, nickel, nickel oxide, ceramics, or graphene. In an embodiment, the fuel cell has a total thickness of no less than 1 micron.

Also discussed herein is a fuel cell stack comprising a multiplicity of fuel cells, wherein each fuel cell comprises an anode no greater than 25 microns in thickness, a cathode no greater than 25 microns in thickness, an electrolyte no greater than 10 microns in thickness, and an interconnect having a thickness of from 100 nm to 100 microns. In an embodiment, each fuel cell comprises a barrier layer between the anode and the electrolyte, or a barrier layer between the cathode and the electrolyte, or both barrier layers. In an embodiment, the barrier layers are the interconnects. For example, the interconnect is made of silver. For example, the interconnect has a thickness of from 500 nm to 1000 nm. In an embodiment, the interconnect is made of a material comprising metal, stainless steel, silver, metal alloys, nickel, nickel oxide, ceramics, or graphene.

In an embodiment, the cathode has a thickness of no greater than 15 microns, or no greater than 10 microns, or no greater than 5 microns. In an embodiment, the anode has a thickness of no greater than 15 microns, or no greater than 10 microns, or no greater than 5 microns. In an embodiment, the electrolyte has a thickness of no greater than 5 microns, or no greater than 2 microns, or no greater than 1 micron, or no greater than 0.5 micron. In an embodiment, each fuel cell has a total thickness of no less than 1 micron.

Further discussed herein is a method of making a fuel cell comprising (a) forming an anode no greater than 25 microns in thickness, (b) forming a cathode no greater than 25 microns in thickness, and (c) forming an electrolyte no greater than 10 microns in thickness. In an embodiment, steps (a)-(c) are performed using additive manufacturing. In various embodiments, said additive manufacturing employs extrusion, photopolymerization, powder bed fusion, material jetting, binder jetting, directed energy deposition, lamination.

In an embodiment, the method comprises assembling the anode, the cathode, and the electrolyte using additive manufacturing. In an embodiment, the method comprises forming an interconnect and assembling the interconnect with the anode, the cathode, and the electrolyte.

In an embodiment, the method comprises making at least one barrier layer. In an embodiment, said at least one barrier layer is used between the electrolyte and the cathode or between the electrolyte and the anode or both. In an embodiment, said at least one barrier layer is also an interconnect.

In an embodiment, the method comprises heating the fuel cell such that shrinkage rates of the anode, the cathode, and the electrolyte are matched. In an embodiment, such heating takes place for no greater than 30 minutes, preferably no greater than 30 seconds, and most preferably no greater than 30 milliseconds. In this disclosure, matching shrinkage rates during heating is discussed in details below (Matching SRTs). When a fuel cell comprises a first composition and a second composition, wherein the first composition has a first shrinkage rate and the second composition has a second shrinkage rate, the heating described in this disclosure preferably takes place such that the difference between the first shrinkage rate and the second shrinkage rate is no greater than 75% of the first shrinkage rate.

In a preferred embodiment, the heating employs electromagnetic radiation (EMR). In various embodiments, EMR comprises UV light, near ultraviolet light, near infrared light, infrared light, visible light, laser, electron beam. Preferably, heating is performed in situ.

Also disclosed herein is a method of making a fuel cell stack comprising a multiplicity of fuel cells, the method comprising (a) forming an anode no greater than 25 microns in thickness in each fuel cell, (b) forming a cathode no greater than 25 microns in thickness in each fuel cell, (c) forming an electrolyte no greater than 10 microns in thickness in each fuel cell, and (d) producing an interconnect having a thickness of from 100 nm to 100 microns in each fuel cell.

In an embodiment, steps (a)-(d) are performed using additive manufacturing. In various embodiments, said additive manufacturing employs extrusion, photopolymerization, powder bed fusion, material jetting, binder jetting, directed energy deposition, and/or lamination.

In an embodiment, the method comprises assembling the anode, the cathode, the electrolyte, and the interconnect using additive manufacturing. In an embodiment, the method comprises making at least one barrier layer in each fuel cell. In an embodiment, said at least one barrier layer is used between the electrolyte and the cathode or between the electrolyte and the anode or both. In an embodiment, said at least one barrier layer is the interconnect.

In an embodiment, the method comprises heating each fuel cell such that shrinkage rates of the anode, the cathode, and the electrolyte are matched. In an embodiment, such heating takes place for no greater than 30 minutes, or no greater than 30 seconds, or no greater than 30 milliseconds. In an embodiment, said heating comprises electromagnetic radiation (EMR). In various embodiments, EMR comprises UV light, near ultraviolet light, near infrared light, infrared light, visible light, laser, electron beam. In an embodiment, heating is performed in situ.

In an embodiment, the method comprises heating the entire fuel cell stack such that shrinkage rates of the anode, the cathode, and the electrolyte are matched. In an embodiment, such heating takes place for no greater than 30 minutes, or no greater than 30 seconds, or no greater than 30 milliseconds.

Herein discussed is a method of making an electrolyte comprising (a) formulating a colloidal suspension, wherein the colloidal suspension comprises an additive, particles having a range of diameters and a size distribution, and a solvent; (b) forming an electrolyte comprising the colloidal suspension; and (c) heating at least a portion of the electrolyte; wherein formulating the colloidal suspension is preferably optimized by controlling the pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof.

Figure 9:
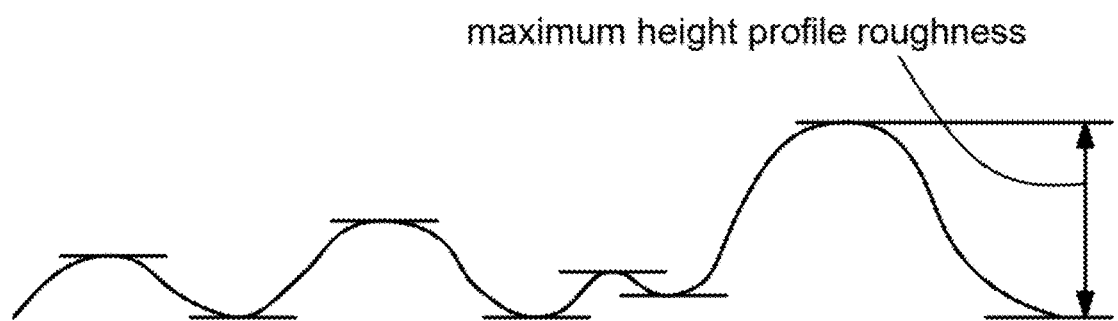
FIG. 9 illustrates maximum height profile roughness, according to an embodiment of this disclosure.

Herein discussed is a method of making a fuel cell comprising (a) obtaining a cathode and an anode; (b) modifying the cathode surface and the anode surface; (c) formulating a colloidal suspension, wherein the colloidal suspension comprises an additive, particles having a range of diameters and a size distribution, and a solvent; (d) forming an electrolyte comprising the colloidal suspension between the modified anode surface and the modified cathode surface; and (e) heating at least a portion of the electrolyte; wherein formulating the colloidal suspension comprises controlling pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof. In various embodiments, the anode and the cathode are obtained via any suitable means. In an embodiment, the modified anode surface and the modified cathode surface have a maximum height profile roughness that is less than the average diameter of the particles in the colloidal suspension. The maximum height profile roughness refers to the maximum distance between any trough and an adjacent peak as illustrated in FIG. 9. In various embodiments, the anode surface and the cathode surface are modified via any suitable means.

Further disclosed herein is a method of making a fuel cell comprising (a) obtaining a cathode and an anode; (b) formulating a colloidal suspension, wherein the colloidal suspension comprises an additive, particles having a range of diameters and a size distribution, and a solvent; (c) forming an electrolyte comprising the colloidal suspension between the anode and the cathode; and (d) heating at least a portion of the electrolyte; wherein formulating the colloidal suspension comprises controlling pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof. In various embodiments, the anode and the cathode are obtained via any suitable means. In an embodiment, the anode surface in contact with the electrolyte and the cathode surface in contact with the electrolyte have a maximum height profile roughness that is less than the average diameter of the particles in the colloidal suspension.

In an embodiment, the solvent comprises water. In an embodiment, the solvent comprises an organic component. In an embodiment, the solvent comprises ethanol, butanol, alcohol, terpineol, Diethyl ether 1,2-Dimethoxyethane (DME (ethylene glycol dimethyl ether), 1-Propanol (n-propanol, n-propyl alcohol), or butyl alcohol. In an embodiment, the solvent surface tension is less than half of water's surface tension in air. In an embodiment, the solvent surface tension is less than 30 mN/m at atmospheric conditions.

In an embodiment, the electrolyte is formed adjacent to a first substrate. In an embodiment, the electrolyte is formed between a first substrate and a second substrate. In an embodiment, the first substrate has a maximum height profile roughness that is less than the average diameter of the particles. In an embodiment, the particles have a packing density greater than 40%, or greater than 50%, or greater than 60%. In an embodiment, the particles have a packing density close to the random close packing (RCP) density.

Random close packing (RCP) is an empirical parameter used to characterize the maximum volume fraction of solid objects obtained when they are packed randomly. A container is randomly filled with objects, and then the container is shaken or tapped until the objects do not compact any further, at this point the packing state is RCP. The packing fraction is the volume taken by number of particles in a given space of volume. The packing fraction determines the packing density. For example, when a solid container is filled with grain, shaking the container will reduce the volume taken up by the objects, thus allowing more grain to be added to the container. Shaking increases the density of packed objects. When shaking no longer increases the packing density, a limit is reached and if this limit is reached without obvious packing into a regular crystal lattice, this is the empirical random close-packed density.

In an embodiment, the median particle diameter is between 50 nm and 1000 nm, or between 100 nm and 500 nm, or approximately 200 nm. In an embodiment, the first substrate comprises particles having a median particle diameter, wherein the median particle diameter of the electrolyte is no greater than 10 times and no less than 1/10 of the median particle diameter of the first substrate. In an embodiment, the first substrate comprises a particle size distribution that is bimodal having a first mode and a second mode, each having a median particle diameter. In an embodiment, the median particle diameter in the first mode of the first substrate is greater than 2 times, or greater than 5 times, or greater than 10 times that of the second mode. In an embodiment, the particle size distribution of the first substrate is adjusted to change the behavior of the first substrate during heating. In an embodiment, the first substrate has a shrinkage that is a function of heating temperature. In an embodiment, the particles in the colloidal suspension has a maximum particle diameter and a minimum particle diameter, wherein the maximum particle diameter is less than 2 times, or less than 3 times, or less than 5 times, or less than 10 times the minimum particle diameter. In an embodiment, the minimum dimension of the electrolyte is less than 10 microns, or less than 2 microns, or less than 1 micron, or less than 500 nm.

In an embodiment, the electrolyte has a gas permeability of no greater than 1 millidarcy, preferably no greater than 100 microdarcy, and most preferably no greater than 1 microdarcy. Preferably, the electrolyte has no cracks penetrating through the minimum dimension of the electrolyte. In an embodiment, the boiling point of the solvent is no less than 200° C., or no less than 100° C., or no less than 75° C. In an embodiment, the boiling point of the solvent is no greater than 125° C., or no greater than 100° C., or no greater than 85° C., no greater than 70° C. In an embodiment, the pH of the colloidal suspension is no less than 7, or no less than 9, or no less than 10.

In an embodiment, the additive comprises polyethylene glycol (PEG), ethyl cellulose, polyvinylpyrrolidone (PVP), polyvinyl butyral (PVB), butyl benzyl phthalate (BBP), polyalkalyne glycol (PAG). In an embodiment, the additive concentration is no greater than 100 mg/cm3, or no greater than 50 mg/cm3, or no greater than 30 mg/cm3, or no greater than 25 mg/cm3.

In an embodiment, the colloidal suspension is milled. In an embodiment, the colloidal suspension is milled using a rotational mill. In an embodiment, the rotational mill is operated at no less than 20 rpm, or no less than 50 rpm, or no less than 100 rpm, or no less than 150 rpm. In an embodiment, the colloidal suspension is milled using zirconia milling balls or tungsten carbide balls. In an embodiment, the colloidal suspension is milled for no less than 2 hours, or no less than 4 hours, or no less than 1 day, or no less than 10 days.

In an embodiment, the particle concentration in the colloidal suspension is no greater than 30 wt %, or no greater than 20 wt %, or no greater than 10 wt %. In an embodiment, the particle concentration in the colloidal suspension is no less than 2 wt %. In an embodiment, the particle concentration in the colloidal suspension is no greater than 10 vol %, or no greater than 5 vol %, or no greater than 3 vol %, or no greater than 1 vol %. In an embodiment, the particle concentration in the colloidal suspension is no less than 0.1 vol %.

In an embodiment, the electrolyte is formed using an additive manufacturing machine (AMM). In an embodiment, the first substrate is formed using an AMM. In an embodiment, said heating comprises the use of electromagnetic radiation (EMR). In an embodiment, the EMR comprises UV light, near ultraviolet light, near infrared light, infrared light, visible light, laser. In an embodiment, the first substrate and the electrolyte are heated to cause co-sintering. In an embodiment, the first substrate, the second substrate, and the electrolyte are heated to cause co-sintering. In an embodiment, the EMR is controlled to preferentially sinter the first substrate over the electrolyte.

In an embodiment, the electrolyte is in compression throughout its thickness after heating. In an embodiment, the first substrate and the second substrate apply compressive stress to the electrolyte after heating. In an embodiment, the first substrate and the second substrate are anode and cathode of a fuel cell. In an embodiment, the minimum dimension of the electrolyte is between 500 nm and 5 microns. In an embodiment, the minimum dimension of the electrolyte is between 1 micron and 2 microns.

The detailed discussion takes the production of solid oxide fuel cells (SOFCs) as an example. As one in the art recognizes, the methodology and the manufacturing process are applicable to all fuel cell types. As such, the production of all fuel cell types is within the scope of this disclosure.

Fuel Cell Cartridge

Figure 11A:
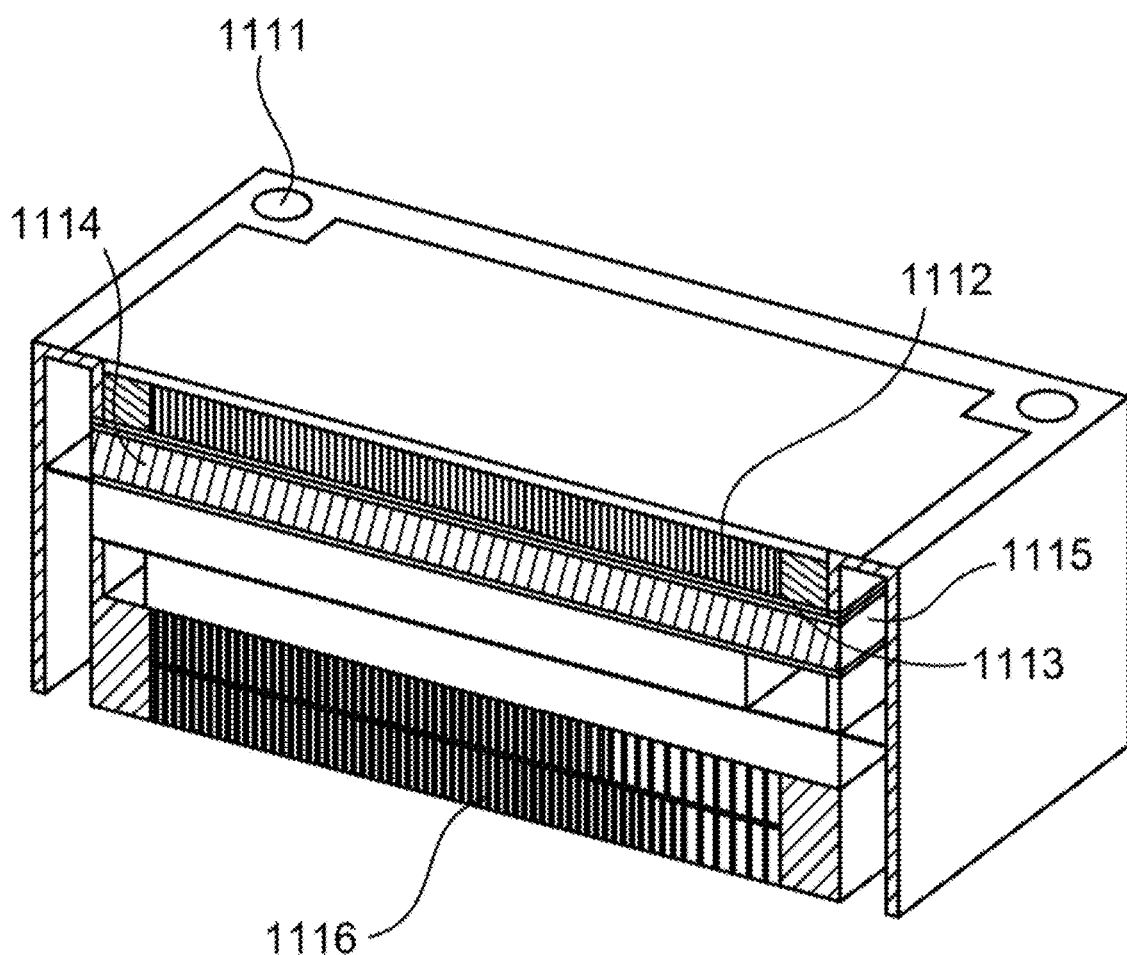
FIG. 11A illustrates a perspective view of a fuel cell cartridge (FCC), according to an embodiment of this disclosure.

In various embodiments, the fuel cell stack is configured to be made into a cartridge form, such as an easily detachable flanged fuel cell cartridge (FCC) design. Referring to FIG. 11A, 1111 represents holes for bolts; 1112 represents a cathode in the FCC; 1113 represents an electrolyte in the FCC; 1114 represents an anode in the FCC; 1115 represents gas channels in the electrodes (anode and cathode); 1116 represents an integrated multi-fluid heat exchanger in the FCC. In an embodiment, there is no barrier layer between the cathode and the electrolyte. Referring to FIG. 11C, 1130 represents holes for bolts in the FCC; 1131 represents air inlet; 1132 represents air outlet; 1133 represents fuel inlet; 1134 represents fuel outlet; 1135 represents bottom of the FCC; 1136 represents top of the FCC. FIG. 11C illustrates the top view and bottom view of an embodiment of a FCC, in which the length of the oxidant side of the FCC is shown $L_o$, the length of the fuel side of the FCC is shown $L_f$, the width of the oxidant (air) entrance is shown $W_o$, the width of the fuel entrance is shown $W_f$. In FIG. 11C, two fluid exits are shown (Air Outlet 1132 and Fuel Outlet 1134). In some cases, the anode exhaust and the cathode exhaust are mixed and extracted through one fluid exit.

Figure 11B:
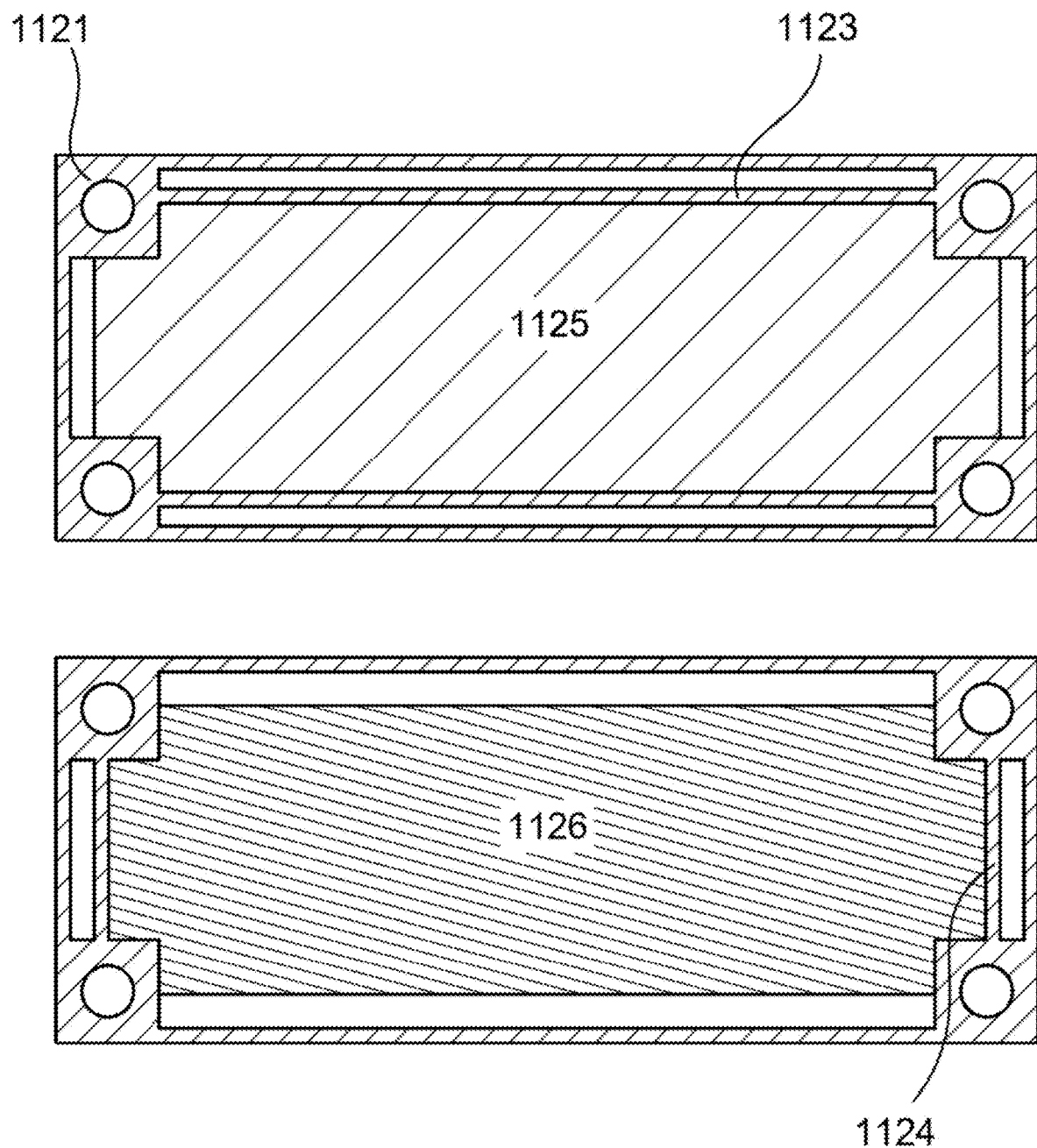
FIG. 11B illustrates cross-sectional views of a fuel cell cartridge (FCC), according to an embodiment of this disclosure.
Figure 11C:
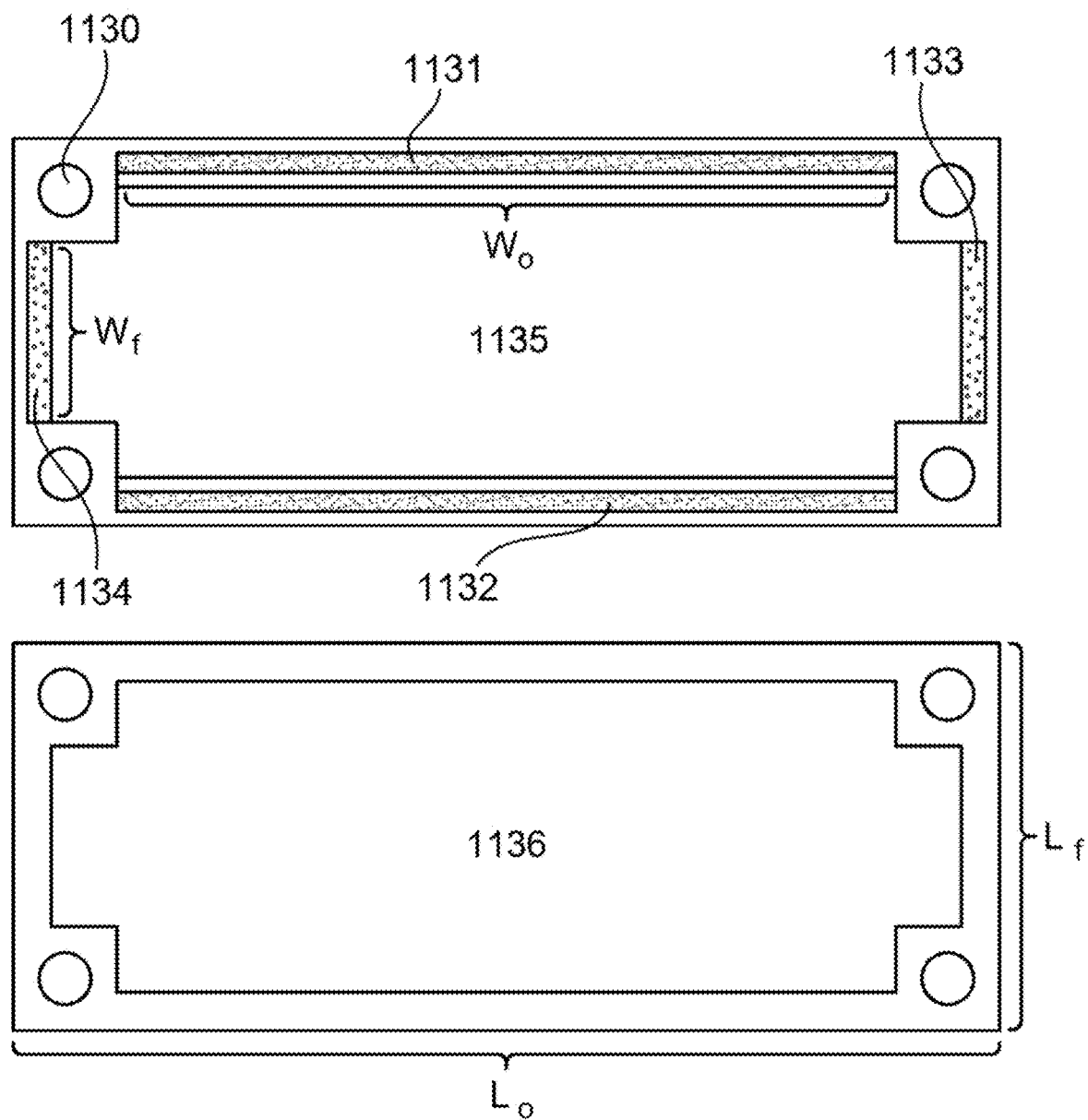
FIG. 11C illustrates top view and bottom view of a fuel cell cartridge (FCC), according to an embodiment of this disclosure.

Referring to FIG. 11B, 1121 represents electrical bolt isolation; 1125 represents anode; 1123 represents seal that seals the anode from air flow; 1126 represents cathode; 1124 represents seal that seals the cathode from fuel flow. FIG. 11B illustrates cross-sectional views of the FCC, wherein air flow is sealed from the anode and fuel flow is sealed from the cathode. The bolts are isolated electrically with a seal as well. In various embodiments, the seal is a dual functional seal (DFS) comprising YSZ (yttria-stabilized zirconia) or a mixture of 3YSZ (3 mol % $Y_2O_3$ in $ZrO_2$) and 8YSZ (8 mol % $Y_2O_3$ in $ZrO_2$). In embodiments, the DFS is impermeable to non-ionic substances and electrically insulating. In an embodiment, the mass ratio of 3YSZ/8YSZ is in the range of from 10/90 to 90/10. In an embodiment, the mass ratio of 3YSZ/8YSZ is about 50/50. In an embodiment, the mass ratio of 3YSZ/8YSZ is 100/0 or 0/100.

Herein disclosed is a fuel cell cartridge (FCC) comprising an anode, a cathode, an electrolyte, an interconnect, a fuel entrance on a fuel side of the FCC, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_0$ is in the range of 0.1 to 1.0, or 0.1 to 0.9, or 0.2 to 0.9, or 0.5 to 0.9, or 0.5 to 1.0.

In an embodiment, said entrances and exit are on one surface of the FCC and said FCC comprises no protruding fluid passage on said surface. In an embodiment, said surface is smooth with a maximum elevation change of no greater than 1 mm, or no greater than 100 microns, or no greater than 10 microns.

In an embodiment, the FCC comprises a barrier layer between the electrolyte and the cathode or between the electrolyte and the anode or both. In an embodiment, the FCC comprises dual functional seal that is impermeable to non-ionic substances and electrically insulating. In an embodiment, said dual functional seal comprises YSZ (yttria-stabilized zirconia) or a mixture of 3YSZ (3 mol % $Y_2O_3$ in $ZrO_2$) and 8YSZ (8 mol % $Y_2O_3$ in $ZrO_2$).

In an embodiment, said interconnect comprises no fluid dispersing element and said anode and cathode comprise fluid dispersing components. In an embodiment, said interconnect comprises no fluid dispersing element and said anode and cathode comprise fluid channels.

In an embodiment, the FCC is detachably fixed to a mating surface and not soldered nor welded to said mating surface. In an embodiment, the FCC is bolted to or pressed to said mating surface. In an embodiment, said mating surface comprises matching fuel entrance, matching oxidant entrance, and at least one matching fluid exit.

Also discussed herein is a fuel cell cartridge (FCC) comprising an anode, a cathode, an electrolyte, an interconnect, a fuel entrance, an oxidant entrance, at least one fluid exit, wherein said entrances and exit are on one surface of the FCC and said FCC comprises no protruding fluid passage on said surface. In an embodiment, said surface is smooth with a maximum elevation change of no greater than 1 mm, or no greater than 100 microns, or no greater than 10 microns.

In an embodiment, the FCC comprises dual functional seal that is impermeable to non-ionic substances and electrically insulating. In an embodiment, said interconnect comprises no fluid dispersing element and said anode and cathode comprise fluid dispersing components. In an embodiment, said interconnect comprises no fluid dispersing element and said anode and cathode comprise fluid channels.

In an embodiment, the FCC is detachably fixed to a mating surface and not soldered nor welded to said mating surface. In an embodiment, the FCC is bolted to or pressed to said mating surface. In an embodiment, said mating surface comprises matching fuel entrance, matching oxidant entrance, and at least one matching fluid exit.

Further disclosed herein is an assembly comprising a fuel cell cartridge (FCC) and a mating surface, wherein the FCC comprises an anode, a cathode, an electrolyte, an interconnect, a fuel entrance on a fuel side of the FCC, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_0$ is in the range of 0.1 to 1.0, or 0.1 to 0.9, or 0.2 to 0.9, or 0.5 to 0.9, or 0.5 to 1.0, wherein the FCC is detachably fixed to the mating surface.

In an embodiment, the FCC is not soldered nor welded to said mating surface. In an embodiment, the FCC is bolted to or pressed to said mating surface. In an embodiment, said mating surface comprises matching fuel entrance, matching oxidant entrance, and at least one matching fluid exit.

In an embodiment, said entrances and exit are on one surface of the FCC and said FCC comprises no protruding fluid passage on said surface. In an embodiment, said surface is smooth with a maximum elevation change of no greater than 1 mm, or no greater than 100 microns, or no greater than 10 microns.

In an embodiment, said interconnect comprises no fluid dispersing element and said anode and cathode comprise fluid dispersing components. In an embodiment, said interconnect comprises no fluid dispersing element and said anode and cathode comprise fluid channels.

Discussed herein is a method comprising pressing or bolting together a fuel cell cartridge (FCC) and a mating surface, said method excluding welding or soldering together the FCC and the mating surface, wherein the FCC comprises an anode, a cathode, an electrolyte, an interconnect, a fuel entrance on a fuel side of the FCC, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_0$ is in the range of 0.1 to 1.0, or 0.1 to 0.9, or 0.2 to 0.9, or 0.5 to 0.9, or 0.5 to 1.0, wherein the FCC and the mating surface are detachable.

In an embodiment, said entrances and exit are on one surface of the FCC and said FCC comprises no protruding fluid passage on said surface. In an embodiment, said surface is smooth with a maximum elevation change of no greater than 1 mm, or no greater than 100 microns, or no greater than 10 microns. In an embodiment, said interconnect comprises no fluid dispersing element and said anode and cathode comprise fluid dispersing components. In an embodiment, said interconnect comprises no fluid dispersing element and said anode and cathode comprise fluid channels.

Herein disclosed is a fuel cell cartridge (FCC) comprising a fuel cell and a fuel cell casing, wherein the fuel cell comprises an anode, a cathode, and an electrolyte, wherein at least a portion of the fuel cell casing is made of the same material as the electrolyte. In an embodiment, the electrolyte is in contact with the portion of the fuel cell casing made of the same material. In an embodiment, the electrolyte and the portion of the fuel cell casing are made of a dual functional seal (DFS), wherein the DFS comprises 3YSZ (3 mol % Y2O3 in ZrO2) and 8YSZ (8 mol % Y2O3 in ZrO2), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20.

In an embodiment, said fuel cell casing comprises a fuel entrance and fuel passage for the anode, an oxidant entrance and oxidant passage for the cathode, and at least one fluid exit. In an embodiment, said entrances and exit are on one surface of the FCC and said FCC comprises no protruding fluid passage on said surface. In an embodiment, the fuel cell casing is in contact with at least a portion of the anode.

In an embodiment, the FCC comprises a barrier layer between the electrolyte and the cathode and between the fuel cell casing and the cathode. In an embodiment, the FCC comprises an interconnect, wherein the interconnect comprises no fluid dispersing element and said anode and cathode comprise fluid dispersing components. In an embodiment, the FCC comprises an interconnect, wherein the interconnect comprises no fluid dispersing element and said anode and cathode comprise fluid channels.

In an embodiment, the FCC is detachably fixed to a mating surface and not soldered nor welded to said mating surface. In an embodiment, said mating surface comprises matching fuel entrance, matching oxidant entrance, and at least one matching fluid exit.

Also discussed herein is a dual functional seal (DFS) comprising 3YSZ (3 mol % Y2O3 in ZrO2) and 8YSZ (8 mol % Y2O3 in ZrO2), wherein the mass ratio of 3YSZ/8YSZ is in the range of from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20. In an embodiment, the DFS is used as an electrolyte in a fuel cell or as a portion of a fuel cell casing or both.

Further disclosed herein is a method comprising providing a dual functional seal (DFS) in a fuel cell system, wherein the DFS comprises 3YSZ (3 mol % Y2O3 in $ZrO_2$) and 8YSZ (8 mol % $Y_2O_3$ in $ZrO_2$), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20.

In an embodiment, the DFS is used as electrolyte or a portion of a fuel cell casing or both in the fuel cell system. In an embodiment, said portion of a fuel cell casing is the entire fuel cell casing. In an embodiment, said portion of a fuel cell casing is a coating on the fuel cell casing. In an embodiment, the electrolyte and said portion of a fuel cell casing are in contact.

Disclosed herein is a fuel cell system comprising an anode having six surfaces, a cathode having six surfaces, an electrolyte, and an anode surround in contact with at least three surfaces of the anode, wherein the electrolyte is part of the anode surround and said anode surround is made of the same material as the electrolyte. In an embodiment, said same material is a dual functional seal (DFS) comprising 3YSZ (3 mol % Y2O3 in ZrO2) and 8YSZ (8 mol % Y2O3 in ZrO2), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20.

In an embodiment, the anode surround is in contact with five surfaces of the anode. In an embodiment, the fuel cell system comprises a barrier layer between the cathode and a cathode surround, wherein the barrier layer is in contact with at least three surfaces of the cathode, wherein the electrolyte is part of the cathode surround and said cathode surround is made of the same material as the electrolyte.

In an embodiment, the fuel cell system comprises fuel passage and oxidant passage in the anode surround and the cathode surround. In an embodiment, the fuel cell system comprises an interconnect, wherein the interconnect comprises no fluid dispersing element and said anode and cathode comprise fluid dispersing components. In an embodiment, the fuel cell system comprises an interconnect, wherein the interconnect comprises no fluid dispersing element and said anode and cathode comprise fluid channels.

Electrochemical (EC) Gas Producer

Figure 10A:
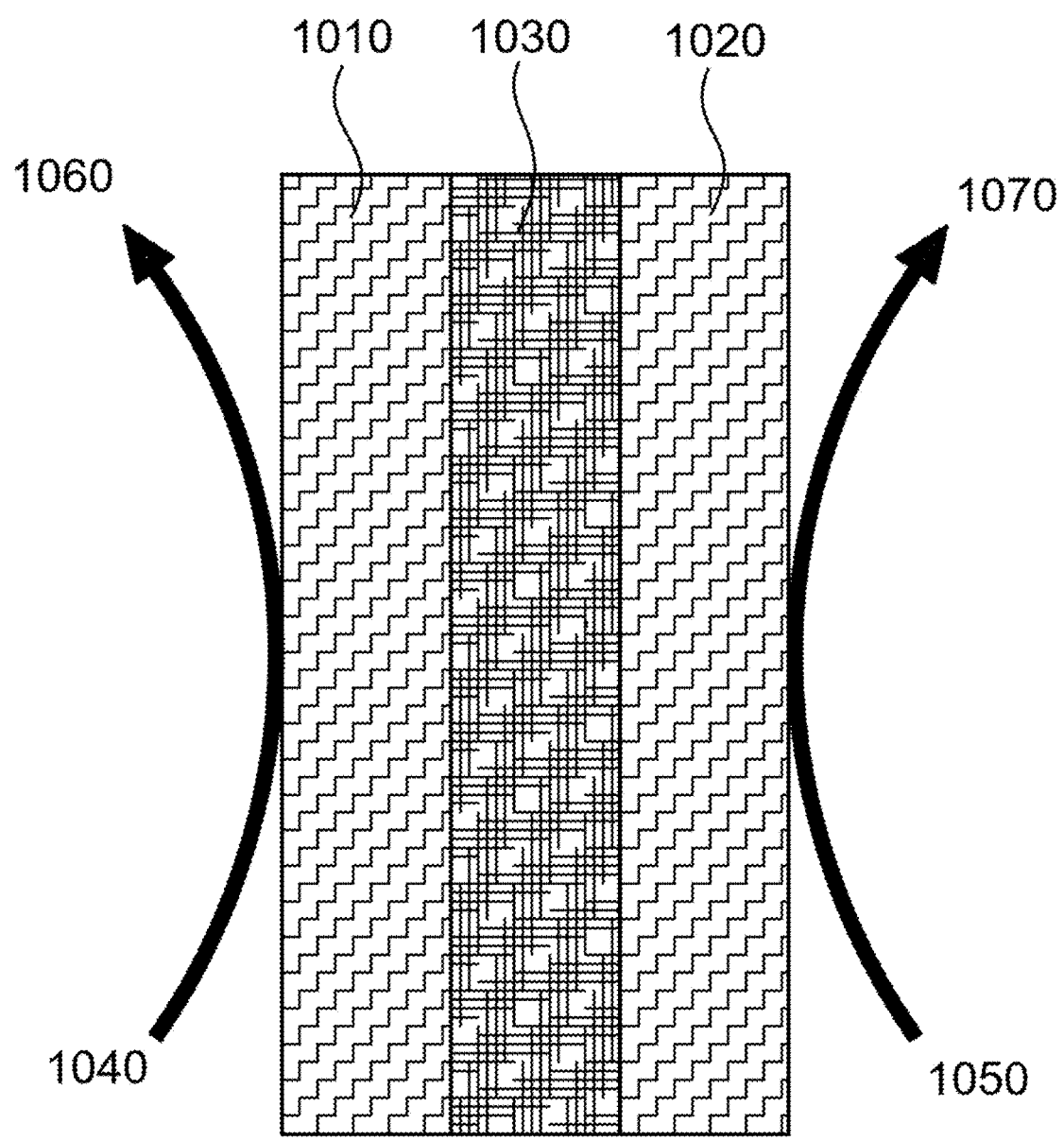
FIG. 10A illustrates an electrochemical (EC) gas producer comprising a first electrode, an electrolyte, and a second electrode, wherein the first electrode receives methane and water or methane and carbon dioxide and the second electrode receives water, according to an embodiment of this disclosure.
Figure 10B:
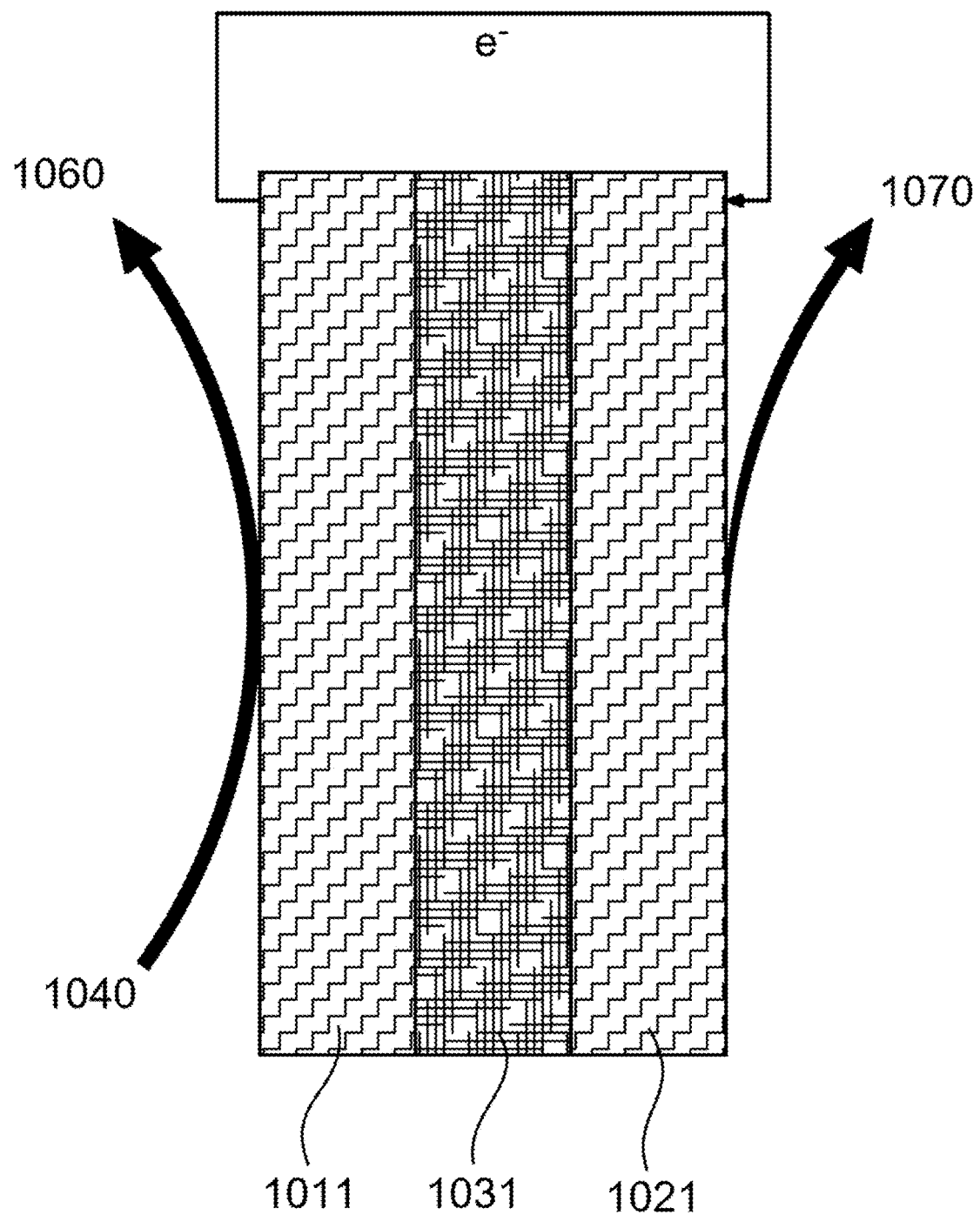
FIG. 10B illustrates an EC gas producer comprising a first electrode, an electrolyte, and a second electrode, wherein the first electrode receives methane and water or methane and carbon dioxide and the second electrode receives nothing, according to an embodiment of this disclosure.

Referring to FIG. 10A and FIG. 10B, herein disclosed is a device (an EC gas producer) comprising a first electrode 1010, 1011, a second electrode 1020, 1021, and an electrolyte 1030, 1031 between the electrodes, wherein the first electrode 1010, 1011 is configured to receive a fuel and no oxygen 1040, wherein the second electrode 1020, 1021 is configured to receive water or nothing 1050, wherein the device is configured to simultaneously produce hydrogen 1070 from the second electrode and syngas 1060 from the first electrode. In an embodiment, 1040 represents methane and water or methane and carbon dioxide. In an embodiment, 1030 represents an oxide ion conducting membrane. In an embodiment, 1031 represents a proton conducting membrane, 1011 and 1021 represent Ni-barium zirconate electrodes. In an embodiment, 1010 and 1020 represent Ni—YSZ or NiO—YSZ electrodes, 1040 represents hydrocarbon and water or hydrocarbon and carbon dioxide, and 1050 represents water or water and hydrogen. In an embodiment, 1010 represents Cu—CGO electrode optionally with CuO or $Cu_2O$ or combinations thereof, 1020 represents Ni—YSZ or NiO—YSZ electrode, 1040 represents hydrocarbon with little to no water, with no carbon dioxide, and with no oxygen, and 1050 represents water or water and hydrogen.

In this disclosure, no oxygen means there is no oxygen present at the first electrode or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from the second electrode is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In an embodiment, said first electrode is configured to receive methane and water or methane and carbon dioxide. In an embodiment, said fuel comprises a hydrocarbon having a carbon number in the range of 1-12 or 1-10 or 1-8.

Most preferably, the fuel is methane or natural gas, which is predominantly methane. In an embodiment, the device does not generate electricity. In an embodiment, the device comprises a mixer configured to receive at least a portion of the first electrode product and at least a portion of the second electrode product. In an embodiment, said mixer is configured to generate a gas stream in which the hydrogen to carbon oxides ratio is no less than 2 or no less than 3 or between 2 and 3.

In an embodiment, said first electrode or second electrode or both comprise a catalyst and a substrate, wherein the mass ratio between the catalyst and the substrate is in no less than 1/100 or no less than 1/10 or no less than 1/5, or no less than 1/3, or no less than 1/1. In an embodiment, the catalyst comprises nickel oxide, silver, cobalt, cesium, nickel, iron, manganese, nitrogen, tetra-nitrogen, molybdenum, copper, chromium, rhodium, ruthenium, palladium, osmium, iridium, platinum, or combinations thereof. In an embodiment, the substrate comprises gadolinium, CeO2, ZrO2, SiO2, TiO2, steel, cordierite (2MgO-2Al2O3-5SiO2), aluminum titanate (Al2TiO5), silicon carbide (SiC), all phases of aluminum oxide, yttria or scandia-stabilized zirconia (YSZ), gadolinia or samaria-doped ceria, or combinations thereof. In an embodiment, said first electrode or second electrode or both comprise a promoter. In an embodiment, said promoter comprises Mo, W, Ba, K, Mg, Fe, or combinations thereof.

In an embodiment, said electrodes and electrolyte form a repeat unit and said device comprises multiple repeat units separated by interconnects. In an embodiment, the interconnects comprise no fluid dispersing element. In an embodiment, said first electrode or second electrode or both comprise fluid channels or alternatively said first electrode or second electrode or both comprise fluid dispersing components.

Also discussed herein is a method comprising forming a first electrode, forming a second electrode, and forming an electrolyte between the electrodes, wherein the electrodes and electrolyte are assembled as they are formed, wherein the first electrode is configured to receive a fuel and no oxygen, wherein the second electrode is configured to receive water only or nothing, wherein the device is configured to simultaneously produce hydrogen from the second electrode and syngas from the first electrode.

In an embodiment, said forming comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In an embodiment, said electrodes and electrolyte form a repeat unit and said method comprises forming said multiple repeat units and forming interconnects between the repeat units.

In an embodiment, the method comprises forming fluid channels or fluid dispersing components in the first electrode or the second electrode or both. In an embodiment, the method comprises heating in situ. In an embodiment, said heating comprises electromagnetic radiation (EMR). In an embodiment, EMR comprises UV light, near ultraviolet light, near infrared light, infrared light, visible light, laser, electron beam.

Further discussed herein is a method comprising providing a device comprising a first electrode, a second electrode, and an electrolyte between the electrodes, introducing a fuel without oxygen to the first electrode, introducing water only or nothing to the second electrode to generate hydrogen, extracting hydrogen from the second electrode, and extracting syngas from the first electrode. In an embodiment, the fuel comprises methane and water or methane and carbon dioxide. In an embodiment, said fuel comprises a hydrocarbon having a carbon number in the range of 1-12 or 1-10 or 1-8.

In an embodiment, the method comprises feeding at least a portion of the extracted syngas to a Fischer-Tropsch reactor. In an embodiment, the method comprises feeding at least a portion of the extracted hydrogen to the Fischer-Tropsch reactor. In an embodiment, said at least portion of the extracted syngas and said at least portion of the extracted hydrogen are adjusted such that the hydrogen to carbon oxides ratio is no less than 2 or no less than 3 or between 2 and 3.

In an embodiment, the fuel is directly introduced into the first electrode or water is directly introduced into the second electrode or both. In an embodiment, said first electrode or second electrode or both comprise a catalyst and a substrate, wherein the mass ratio between the catalyst and the substrate is in no less than 1/100 or no less than 1/10 or no less than 1/5, or no less than 1/3, or no less than 1/1. In an embodiment, the catalyst comprises nickel oxide, silver, cobalt, cesium, nickel, iron, manganese, nitrogen, tetra-nitrogen, molybdenum, copper, chromium, rhodium, ruthenium, palladium, osmium, iridium, platinum, or combinations thereof. In an embodiment, the substrate comprises gadolinium, CeO2, ZrO2, SiO2, TiO2, steel, cordierite (2MgO-2Al2O3-5SiO2), aluminum titanate (Al2TiO5), silicon carbide (SiC), all phases of aluminum oxide, yttria or scandia-stabilized zirconia (YSZ), gadolinia or samaria-doped ceria, or combinations thereof.

In an embodiment, the method comprises applying a potential difference between the electrodes. In an embodiment, the method comprises using the extracted hydrogen in one of the following or combinations thereof: Fischer-Tropsch (FT) reaction; Dry reforming reactions; Sabatier reaction catalyzed by nickel; Bosch reaction; Reverse water gas shift reaction; Electrochemical reaction to produce electricity; Production of ammonia and/or fertilizer; Electrochemical compressor for hydrogen storage or fueling hydrogen vehicles; Hydrogenation reactions.

The gas producer is not a fuel cell and does not generate electricity, in various embodiments. Electricity may be applied to the gas producer at the anode and cathode in some cases. In other cases, electricity is not needed.

Electrodes

Both the cathode and the anode are electrodes in the electrochemical gas producer. Examples of anode and cathode material are discussed below. In an operating device, the actual anode and cathode designation depends on where reduction and oxidation reactions take place. In certain embodiments, a material acts as an anode with a set of operating conditions and/or feedstocks and the same material acts as a cathode with a different set of operating conditions and/or feedstocks. As such, the listing of material under anode or cathode is not limiting. Furthermore, the listings of anode/cathode materials apply to the first electrode and second electrode as discussed above.

In an embodiment, the cathode comprises perovskites, such as LSC, LSCF, LSM. In an embodiment, the cathode comprises lanthanum, cobalt, strontium, manganite. In an embodiment, the cathode is porous. In an embodiment, the cathode comprises YSZ, Nitrogen, Nitrogen Boron doped Graphene, La0.6Sr0.4Co0.2Fe0.8O3, SrCo0.5Sc0.5O3, BaFe0.75Ta0.25O3, BaFe0.875Re0.125O3, Ba0.5La0.125Zn0.375NiO3, Ba0.75Sr0.25Fe0.875Ga0.125O3, BaFe0.125Co0.125, Zr0.75O3. In an embodiment, the cathode comprises LSCo, LCo, LSF, LSCoF. In an embodiment, the cathode comprises perovskites LaCoO3, LaFeO3, LaMnO3, (La,Sr)MnO3, LSM-GDC, LSCF-GDC, LSC-GDC. Cathodes containing LSCF are suitable for intermediate-temperature electrochemical gas producer operation. In an embodiment, the cathode comprises Cu—CGO, CuO—CGO, $Cu_2O$—CGO, or combinations thereof.

In an embodiment, the cathode comprises a material selected from the group consisting of lanthanum strontium manganite, lanthanum strontium ferrite, and lanthanum strontium cobalt ferrite. In an embodiment, the cathode comprises lanthanum strontium manganite.

In an embodiment, the cathode comprises $Ba(Ce_{0.4}Pr_{0.4}Y_{0.2})O_3$; $PrBaCuFeO_5$; $BaCe_{0.5}Bi_{0.5}O_3$; $SmBaCo_2O_5$; $BaCe_{0.5}Fe_{0.5}O_3$; $GdBaCo_2O_5$; $SmBa_{0.5}Sr_{0.5}Co_2O_5$; $PrBaCo_2O_5$; or combinations thereof. In an embodiment, the cathode is a composite comprising $Ba_{0.5}Sr_{0.5}Co_{0.5}Fe_{0.5}O_3$ and BZCY (for example in a weight ratio of 3:2), wherein BZCY is $BaZr_{0.1}Ce_{0.2}Y_{0.2}O_3$. In an embodiment, the cathode is a composite comprising $Sm_{0.5}Sr_{0.5}CoO_3$ and $Ce_{0.8}Sm_{0.2}O_2$ (for example in a weight ratio of 6:4). In an embodiment, the cathode is a composite comprising $Sm_{0.5}Sr_{0.5}CoO_3$ and BZCY (for example in a weight ratio of 7:3).

In an embodiment, the anode comprises Nickle-Oxide, Nickle-Oxide-YSZ, NiO-GDC, NiO—SDC, Aluminum doped Zinc Oxide, Molybdenum Oxide, Lanthanum, strontium, chromite, ceria, perovskites (such as, LSCF [La{1−x}Sr{x}Co{1−y}Fe{y}O3] or LSM [La{1−x}Sr{x}MnO3], where x is usually 0.15-0.2 and y is 0.7 to 0.8). In an embodiment, the anode comprises SDC or BZCYYb coating or barrier layer to reduce coking and sulfur poisoning. In an embodiment, the anode is porous. In an embodiment, the anode comprises combination of electrolyte material and electrochemically active material, combination of electrolyte material and electrically conductive material.

In an embodiment, the anode comprises nickel and yttria stabilized zirconia. In an embodiment, the anode is formed by reduction of a material comprising nickel oxide and yttria stabilized zirconia. In an embodiment, the anode comprises nickel and gadolinium stabilized ceria. In an embodiment, the anode is formed by reduction of a material comprising nickel oxide and gadolinium stabilized ceria.

In an embodiment, the anode comprises NiO. In an embodiment, the anode comprises NiO—BZCY (1:1) and pore former. In an embodiment, the anode comprises NiO—BZCY (6:4) and corn starch. In an embodiment, the anode comprises NiO—BZCY (6:4) and starch/NiO—BZCY (6:4). In an embodiment, the anode comprises NiO—BZCY (6:4). In an embodiment, the anode comprises NiO—BZCY. In an embodiment, the anode comprises NiO—BZCY (6:4) and starch/NiO—BZCY (1:1). In an embodiment, the anode comprises Cu—CGO, CuO—CGO, $Cu_2O$—CGO, or combinations thereof.

Electrochemical (EC) Compressor

Herein disclosed is an electrochemical compressor comprising an anode, a cathode, an electrolyte between the anode and the cathode, a porous bipolar plate (PBP), an integrated support, a fluid distributor at a first end of the compressor, and a fluid collector at a second end of the compressor, wherein said support is impermeable to non-ionic substances and electrically insulating. The PBP is electrically conductive and permeable to gases (such as $H_2$, $O_2$).

Figure 10C:
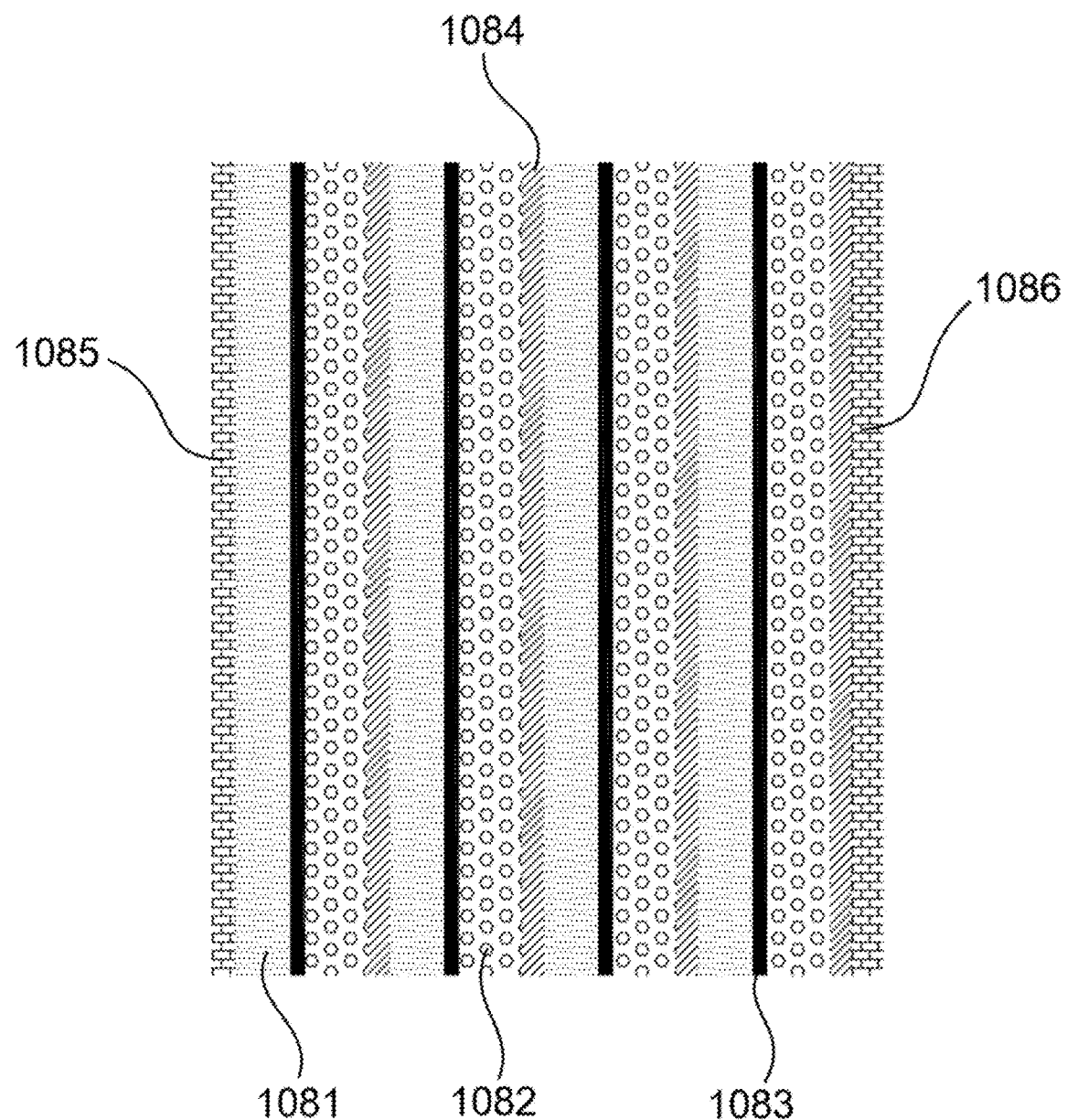
FIG. 10C illustrates an electrochemical compressor comprising anodes, electrolytes, cathodes, porous bipolar plates, a fluid distributor on one end, and a fluid collector on the other end, according to an embodiment of this disclosure.

As illustrated in FIG. 10C, the anode 1081, the electrolyte 1083, the cathode 1082, and the PBP 1084 form a repeat unit. In various embodiments, an electrochemical compressor comprises a multiplicity of such repeat units between the fluid distributor 1085 and the fluid collector 1086.

In an embodiment, the electrochemical compressor is configured to provide between the first end and the second end of the compressor a fluid pressure differential no less than 4000 psi, or no less than 5000 psi, or no less than 6000 psi, or no less than 7000 psi, or no less than 8000 psi, or no less than 9000 psi, or no less than 10000 psi. In an embodiment, said support is part of the electrolyte, or the anode, or the cathode, or the PBP, or combinations thereof. In an embodiment, said support has a lattice structure that is regular or irregular. In an embodiment, the anode or cathode or both comprise fluid channels or alternatively the anode or cathode or both comprise fluid dispersing components.

Also discussed herein is a method of making an electrochemical compressor comprising depositing an anode, a cathode, an electrolyte between the anode and the cathode, and a porous bipolar plate (PBP) to form said compressor. In an embodiment, the method comprises providing a fluid distributor at a first end of the compressor and a fluid collector at a second end of the compressor. In an embodiment, said depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof.

In an embodiment, the method comprises co-sintering the anode, the cathode, the electrolyte, and the PBP. In an embodiment, the method comprises heating in situ. In an embodiment, said heating comprises electromagnetic radiation (EMR). In an embodiment, EMR comprises UV light, near ultraviolet light, near infrared light, infrared light, visible light, laser, electron beam. In an embodiment, the method comprises depositing an integrated support, wherein said support is impermeable to non-ionic substances and electrically insulating. In an embodiment, said support has a lattice structure that is regular or irregular. In an embodiment, said support is part of the electrolyte, or the anode, or the cathode, or the PBP, or combinations thereof. In an embodiment, the method comprises forming fluid dispersing components or fluid channels in the anode or cathode or both.

Further discussed herein is a method of using an electrochemical compressor comprising providing said compressor having an anode, a cathode, an electrolyte between the anode and the cathode, and a porous bipolar plate (PBP), an integrated support, a fluid distributor at a first end of the compressor, and a fluid collector at a second end of the compressor, wherein said support is impermeable to non-ionic substances and electrically insulating.

In an embodiment, said electrochemical compressor provides between the first end and the second end of the compressor a fluid pressure differential no less than 4000 psi, or no less than 5000 psi, or no less than 6000 psi, or no less than 7000 psi, or no less than 8000 psi, or no less than 9000 psi, or no less than 10000 psi. In an embodiment, said electrochemical compressor increases the pressure of hydrogen or oxygen from the first end to the second end.

In an embodiment, the method comprises using the compressor for hydrogen storage. In an embodiment, the method comprises using the compressor for fueling vehicles. In an embodiment, the method comprises using the compressor in pressurized hydrogen refrigeration systems.

As an example, as illustrated in FIG. 10C, all the layers of an electrochemical compressor are formed and assembled via printing. The material for making the anode, the cathode, the electrolyte, the PBP, and the integrated support, respectively, is made into an ink form comprising a solvent and particles (e.g., nanoparticles). The ink optionally comprises a dispersant, a binder, a plasticizer, a surfactant, a co-solvent, or combinations thereof. For the anode and the cathode, NiO and YSZ particles are mixed with a solvent, wherein the solvent is water (e.g., de-ionized water) or an alcohol (e.g., butanol) or a mixture of alcohols. Organic solvents other than alcohols may also be used. For the electrolyte and the support, YSZ particles were mixed with a solvent, wherein the solvent is water (e.g., de-ionized water) or an alcohol (e.g., butanol) or a mixture of alcohols. Organic solvents other than alcohols may also be used. For the PBP, metallic particles (such as, silver nanoparticles) are dissolved in a solvent, wherein the solvent may include water (e.g., de-ionized water), organic solvents (e.g. mono-, di-, or tri-ethylene glycols or higher ethylene glycols, propylene glycol, 1,4-butanediol or ethers of such glycols, thiodiglycol, glycerol and ethers and esters thereof, polyglycerol, mono-, di-, and tri-ethanolamine, propanolamine, N,N-dimethylformamide, dimethyl sulfoxide, dimethylacetamide, N-methylpyrrolidone, 1,3-dimethylimidazolidone, methanol, ethanol, isopropanol, n-propanol, diacetone alcohol, acetone, methyl ethyl ketone, propylene carbonate), and combinations thereof. For an oxygen compressor, the electronically conducting phase in both electrodes comprises LSCF(—CGO) or LSM(-YSZ).

Fischer Tropsch

The method and system of this disclosure are suitable for making a catalyst or a catalyst composite, such as a Fischer-Tropsch (FT) catalyst or catalyst composite. Herein disclosed is a Fischer-Tropsch (FT) catalyst composite comprising a catalyst and a substrate, wherein the mass ratio between the catalyst and the substrate is in no less than 1/100 or no less than 1/10 or no less than 1/5, or no less than 1/3, or no less than 1/1. In an embodiment, the catalyst comprises Fe, Co, Ni, or Ru. In an embodiment, the substrate comprises Al2O3, ZrO2, SiO2, TiO2, CeO2, modified Al2O3, modified ZrO2, modified SiO2, modified TiO2, modified CeO2, gadolinium, steel, cordierite (2MgO-2Al2O3-5SiO2), aluminum titanate (Al2TiO5), silicon carbide (SiC), all phases of aluminum oxide, yttria or scandia-stabilized zirconia (YSZ), gadolinia or samaria-doped ceria, or combinations thereof. In an embodiment, the catalyst composite comprises a promoter. In an embodiment, said promoter comprises noble metals, or metal cations, or combinations thereof. In an embodiment, said promoter comprises B, La, Zr, K, Cu, or combinations thereof. In an embodiment, the catalyst composite comprises fluid channels or alternatively fluid dispersing components.

The FT reactor/system of this disclosure is much smaller than traditional FT reactors/systems (e.g., 3-100 times smaller or 100+ times smaller for the same FT product generation rate). The high catalyst to substrate ratio is not achievable by traditional methods to make FT catalysts. As such, in some embodiments, the FT reactor/system is miniaturized compared to traditional FT reactors/systems.

Also discussed herein is a method comprising depositing a Fischer-Tropsch (FT) catalyst to a substrate to form a FT catalyst composite, wherein said depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In an embodiment, the mass ratio between the catalyst and the substrate is in no less than 1/100 or no less than 1/10 or no less than 1/5, or no less than 1/3, or no less than 1/1. In an embodiment, the method comprises forming fluid channels or alternatively fluid dispersing components in the catalyst composite.

Further discussed herein is a system comprising a Fischer-Tropsch (FT) reactor containing a FT catalyst composite comprising a catalyst and a substrate, wherein the mass ratio between the catalyst and the substrate is in no less than 1/100 or no less than 1/10 or no less than 1/5, or no less than 1/3, or no less than 1/1. In an embodiment, the catalyst comprises Fe, Co, Ni, or Ru. In an embodiment, the substrate comprises Al2O3, ZrO2, SiO2, TiO2, CeO2, modified Al2O3, modified ZrO2, modified SiO2, modified TiO2, modified CeO2, gadolinium, steel, cordierite (2MgO-2Al2O3-5SiO2), aluminum titanate (Al2TiO5), silicon carbide (SiC), all phases of aluminum oxide, yttria or scandia-stabilized zirconia (YSZ), gadolinia or samaria-doped ceria, or combinations thereof. In an embodiment, the catalyst composite comprises a promoter.

As an example, a FT catalyst composite is formed via printing. The catalyst and the substrate/support are made into an ink form comprising a solvent and particles (e.g., nanoparticles). The ink optionally comprises a dispersant, a binder, a plasticizer, a surfactant, a co-solvent, or combinations thereof. The ink may be any kind of suspension. The ink may be treated with a mixing process, such as ultrasonication or high shear mixing. In some cases, an iron ink is in an aqueous environment. In some cases, an iron ink is in an organic environment. The iron ink may also include a promoter. The substrate/support may be a suspension or ink of alumina, in an aqueous environment or an organic environment. The substrate ink may be treated with a mixing process, such as ultrasonication or high shear mixing. In some cases, the substrate ink comprises a promoter. In some cases, the promoter is added as its own ink, in an aqueous environment or an organic environment. In some cases, the various inks are printed separately and sequentially. In some cases, the various inks are printed separately and simultaneously, for example, through different print heads. In some cases, the various inks are printed in combination as a mixture.

As an example, an exhaust from the fuel cell comprises hydrogen, carbon dioxide, water, and optionally carbon monoxide. The exhaust is passed over a FT catalyst (e.g., an iron catalyst) to produce synthetic fuels or lubricants. The FT iron catalyst has the property to promote water gas shift reaction or reverse water gas shift reaction. The FT reactions take place at a temperature in the range of 150-350° C. and a pressure in the range of one to several tens of atmospheres (e.g., 15 atm or 10 atm or 5 atm or 1 atm). Additional hydrogen may be added to the exhaust stream to reach a hydrogen to carbon oxides ratio (carbon dioxide and carbon monoxide) of no less than 2 or no less than 3 or between 2 and 3.

Matching SRTs

In this disclosure, SRT refers to a component of the strain rate tensor. Matching SRTs is contemplated in both heating and cooling processes. In a fuel cell or an EC gas producer or an EC compressor or a FT catalyst, multiple materials or compositions exist. These different materials or compositions often have different thermal expansion coefficients. As such, the heating or cooling process often causes strain or even cracks in the material. We have unexpectedly discovered a treating process (heating or cooling) to match the SRTs of different materials/compositions to reduce, minimize, or even eliminate undesirable effects.

Figure 7:
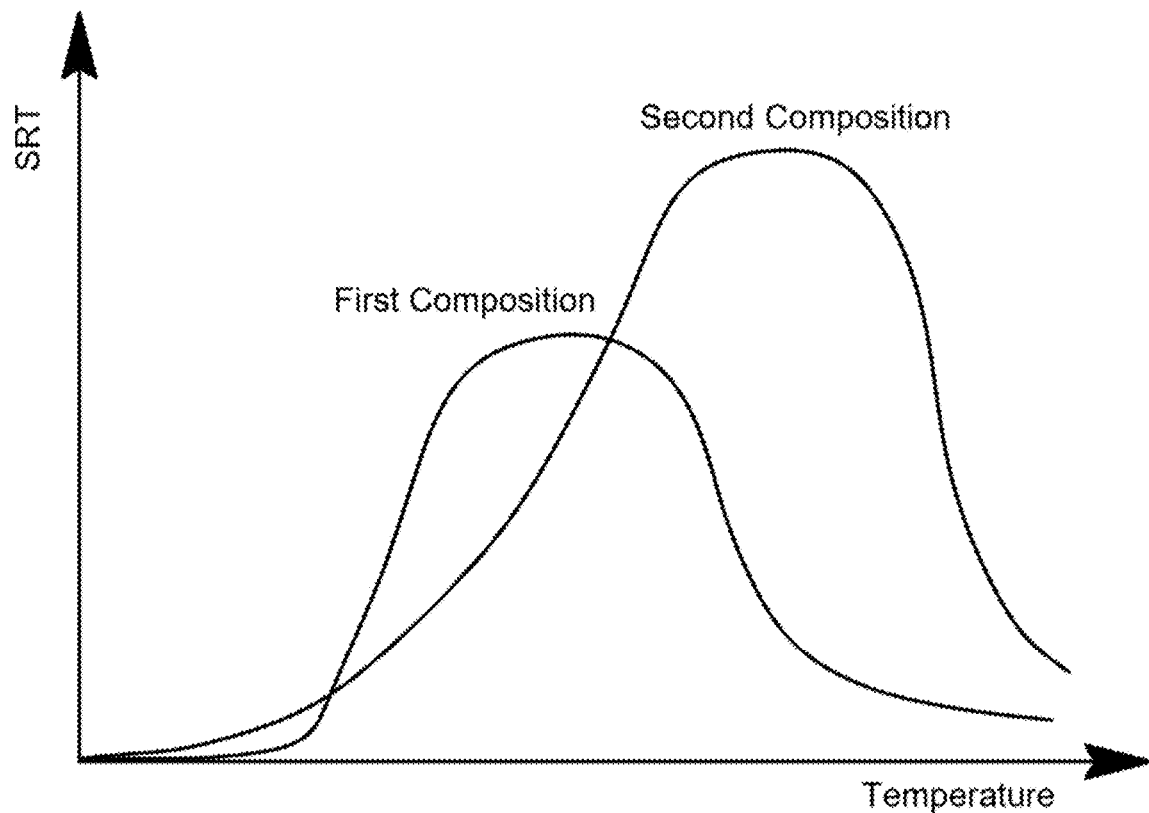
FIG. 7 illustrates SRTs of a first composition and a second composition as a function of temperature, according to an embodiment of this disclosure.

Herein discussed is a method of making a fuel cell, wherein the fuel cell comprises a first composition and a second composition, the method comprising heating the first and second compositions, wherein the first composition has a first SRT and the second composition has a second SRT, such that the difference between the first SRT and the second SRT is no greater than 75% of the first SRT. As an illustration, FIG. 7 shows the SRTs of a first composition and a second composition as a function of temperature.

In an embodiment, wherein the SRTs are measured in mm/min. In an embodiment, the difference between the first SRT and the second SRT is no greater than 50% or 30% or 20% of the first SRT. In an embodiment, heating is achieved via at least one of the following: conduction, convection, radiation. In an embodiment, heating comprises electromagnetic radiation (EMR). In an embodiment, EMR comprises UV light, near ultraviolet light, near infrared light, infrared light, visible light, laser, electron beam.

In an embodiment, the first composition and the second composition are heated at the same time. In an embodiment, the first composition and the second composition are heated at different times. In an embodiment, the first composition is heated for a first period of time, the second composition is heated for a second period of time, wherein at least a portion of the first period of time overlaps with the second period of time.

In an embodiment, heating takes places more than once for the first composition, or for the second composition, or for both. In an embodiment, the first composition and the second composition are heated at different temperatures. In an embodiment, the first composition and the second composition are heated using different means. In an embodiment, the first composition and the second composition are heated for different periods of time. In an embodiment, heating the first composition causes at least partial heating of the second composition, for example, via conduction. In an embodiment, heating causes densification of the first composition, or the second composition, or both.

In an embodiment, the first composition is heated to achieve partial densification resulting in a modified first SRT; and then the first and second compositions are heated such that the difference between the modified first SRT and the second SRT is no greater than 75% of the first modified SRT. In an embodiment, the first composition is heated to achieve partial densification resulting in a modified first SRT, the second composition is heated to achieve partial densification resulting in a modified second SRT; and then the first and second compositions are heated such that the difference between the modified first SRT and the second modified SRT is no greater than 75% of the first modified SRT.

In an embodiment, the fuel cell comprises a third composition having a third SRT. In an embodiment, the third composition is heated such that the difference between the first SRT and the third SRT is no greater than 75% of the first SRT. In an embodiment, the third composition is heated to achieve partial densification resulting in a modified third SRT; and then the first and second and third compositions are heated such that the difference between the first SRT and the modified third SRT is no greater than 75% of the first SRT. In an embodiment, the first and second and third compositions are heated to achieve partial densification resulting in a modified first SRT, a modified second SRT, and a modified third SRT; and then the first and second and third compositions are heated such that the difference between the modified first SRT and the modified second SRT is no greater than 75% of the modified first SRT and the difference between the modified first SRT and the modified third SRT is no greater than 75% of the modified first SRT.

In various embodiments, the method produces a crack free electrolyte in the fuel cell. In various embodiments, heating is performed in situ. In various embodiments, heating causes sintering or co-sintering or both. In various embodiments, heating takes place for no greater than 30 minutes, or no greater than 30 seconds, or no greater than 30 milliseconds.

Figure 8:
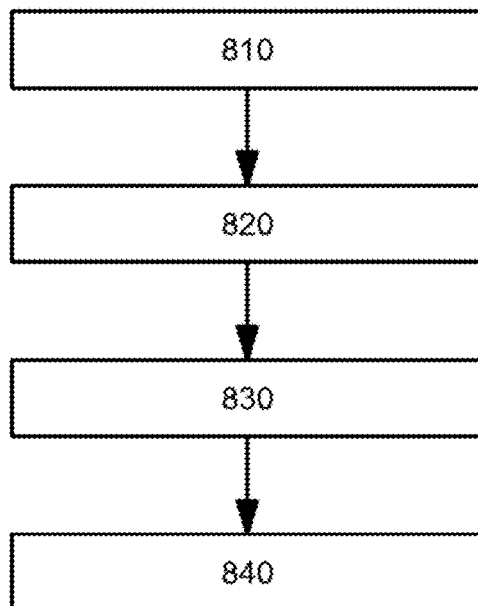
FIG. 8 illustrates a process flow for forming and heating at least a portion of a fuel cell, according to an embodiment of this disclosure.

Referring to FIG. 8, in an embodiment, a process flow diagram is shown for forming and heating at least a portion of a fuel cell. 810 represents forming composition 1. 820 represents heating composition 1 at temperature T1 for time t1. 830 represents forming composition 2. 840 represents heating composition 1 and composition 2 simultaneously at temperature T2 for time t2, wherein at T2, the difference between SRT of composition 1 and SRT of composition 2 is no greater than 75% of SRT of composition 1. Alternatively, 840 represents heating composition 1 and composition 2 simultaneously at temperature T2 and T2' (for example, using different heating mechanisms) for time t2, wherein at T2 and T2', the difference between SRT of composition 1 and SRT of composition 2 is no greater than 75% of SRT of composition 1.

EXAMPLES

The following examples are provided as part of the disclosure of various embodiments of the present invention. As such, none of the information provided below is to be taken as limiting the scope of the invention.

Example 1

Making a Fuel Cell Stack

Example 1 is illustrative of the preferred method of making a fuel cell stack. The method uses an AMM model no. 0012323 from Ceradrop and an EMR model no. 092309423 from Xenon Corp. An interconnect substrate is put down to start the print.

As a first step, an anode layer is made by the AMM. This layer is deposited by the AMM as a slurry A, having the composition as shown in the table below. This layer is allowed to dry by applying heat via an infrared lamp. This anode layer is sintered by hitting it with an electromagnetic pulse from a xenon flash tube for 1 second.

An electrolyte layer is formed on top of the anode layer by the AMM depositing a slurry B, having the composition shown in the table below. This layer is allowed to dry by applying heat via an infrared lamp. This electrolyte layer is sintered by hitting it with an electromagnetic pulse from a xenon flash tube for 60 seconds.

Next a cathode layer is formed on top of the electrolyte layer by the AMM depositing a slurry C, having the composition shown in the table below. This layer is allowed to dry by applying heat via an infrared lamp. This cathode layer is sintered by hitting it with an electromagnetic pulse from a xenon flash tube for ½ second.

An interconnect layer is formed on top of the cathode layer by the AMM depositing a slurry D, having the composition shown in the table below. This layer is allowed to dry by applying heat via an infrared lamp. This interconnect layer is sintered by hitting it with an electromagnetic pulse from a xenon flash tube for 30 seconds.

These steps are then repeated 60 times, with the anode layers being formed on top of the interconnects. The result is a fuel cell stack with 61 fuel cells.

| Composition of Slurries | | |
|---|---|---|
| Slurry | Solvents | Particles |
| A | 100% isopropyl alcohol | 10 wt % NiO-8YSZ |
| B | 100% isopropyl alcohol | 10 wt % 8YSZ |
| C | 100% isopropyl alcohol | 10 wt % LSCF |
| D | 100% isopropyl alcohol | 10 wt % lanthanum chromite |

Example 2

LSCF in Ethanol

Mix 200 ml of ethanol with 30 grams of LSCF powder in a beaker. Centrifuge the mixture and obtain an upper dispersion and a lower dispersion. Extract and deposit the upper dispersion using a 3D printer on a substrate and form a LSCF layer. Use a xenon lamp (10 kW) to irradiate the LSCF layer at a voltage of 400V and a burst frequency of 10 Hz for a total exposure duration of 1,000 ms.

Example 3

CGO in Ethanol

Mix 200 ml of ethanol with 30 grams of CGO powder in a beaker. Centrifuge the mixture and obtain an upper dispersion and a lower dispersion. Extract and deposit the upper dispersion using a 3D printer on a substrate and form a CGO layer. Use a xenon lamp (10 kW) to irradiate the CGO layer at a voltage of 400V and a burst frequency of 10 Hz for a total exposure duration of 8,000 ms.

Example 4

CGO in Water

Mix 200 ml of deionized water with 30 grams of CGO powder in a beaker. Centrifuge the mixture and obtain an upper dispersion and a lower dispersion. Extract and deposit the upper dispersion using a 3D printer on a substrate and form a CGO layer. Use a xenon lamp (10 kW) to irradiate the CGO layer at a voltage of 400V and a burst frequency of 10 Hz for a total exposure duration of 8,000 ms.

Example 5

NiO in Water

Mix 200 ml of deionized water with 30 grams of NiO powder in a beaker. Centrifuge the mixture and obtain an upper dispersion and a lower dispersion. Extract and deposit the upper dispersion using a 3D printer on a substrate and form a NiO layer. Use a xenon lamp (10 kW) to irradiate the NiO layer at a voltage of 400V and a burst frequency of 10 Hz for a total exposure duration of 15,000 ms.

Example 6

Sintering Results

Figure 12:
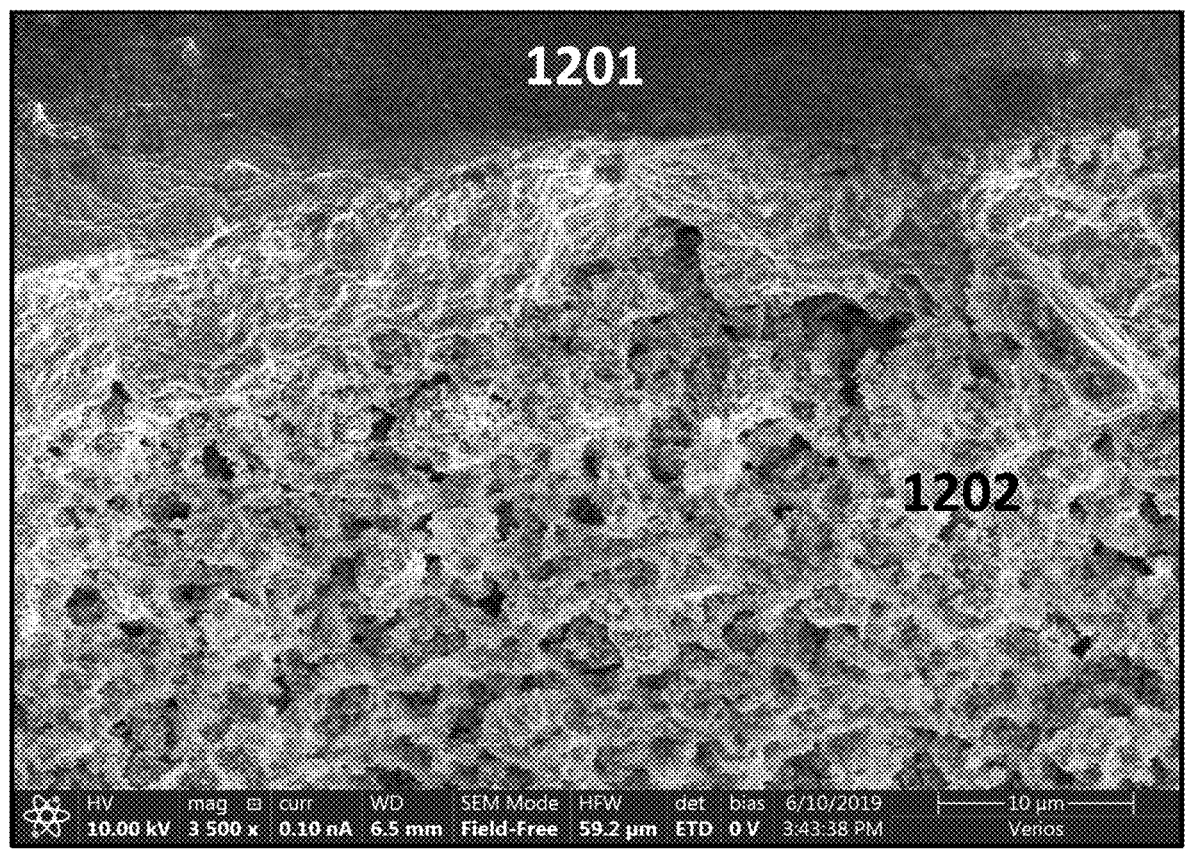
FIG. 12 is a scanning electron microscopy image (side view) illustrating an electrolyte (YSZ) printed and sintered on an electrode (NiO—YSZ), according to an embodiment of this disclosure.

Referring to FIG. 12, an electrolyte 1201 (YSZ) is printed and sintered on an electrode 1202 (NiO—YSZ). The scanning electron microscopy image shows the side view of the sintered structures, which demonstrates gas-tight contact between the electrolyte and the electrode, full densification of the electrolyte, and sintered and porous electrode microstructures.

Example 7

Fuel Cell Stack Configurations

A 48-Volt fuel cell stack has 69 cells with about 1000 Watts of power output. The fuel cell in this stack has a dimension of about 4 cm×4 cm in length and width and about 7 cm in height. A 48-Volt fuel cell stack has 69 cells with about 5000 Watts of power output. The fuel cell in this stack has a dimension of about 8.5 cm×8.5 cm in length and width and about 7 cm in height.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of manufacturing comprising:
   depositing a composition on a substrate slice by slice to form an object; and
   sintering a slice using electromagnetic radiation (EMR) provided by a xenon lamp;
   wherein said composition comprises a first material and a second material, wherein the second material has a higher absorption of the electromagnetic radiation than the first material;
   wherein the first material consists of 8YSZ (8 mol % YSZ), gadolinia-doped ceria (GDC or CGO), Samaria-doped ceria (SDC), Scandia-stabilized zirconia (SSZ), Lanthanum strontium manganite (LSM), Lanthanum Strontium Cobalt Ferrite (LSCF), Lanthanum Strontium Cobaltite (LSC), Lanthanum Strontium Gallium Magnesium Oxide (LSGM), NiO, NiO-YSZ, Cu2O, CuO, lanthanum chromite, doped lanthanum chromite, or combinations thereof; and
   wherein the second material consists of nickel oxide, CGO, NiO-YSZ, NiO-SSZ, LSCF, LSM, doped lanthanum chromite, or combinations thereof.

2. The method of claim 1, wherein the electromagnetic radiation has a power output of no less than 100 W.

3. The method of claim 1, wherein the electromagnetic radiation has a wavelength of 10 to 1500 nm and the EMR has a minimum energy density of 0.1 Joule/cm$^2$.

4. The method of claim 1, wherein said object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel, or a combination of any two or more thereof.

5. The method of claim 1, wherein the second material is deposited in the same slice as the first material.

6. The method of claim 1, wherein the second material is a deposited in a slice adjacent another slice that contains the first material.

7. The method of claim 1, wherein sintering the slice removes at least a portion of the second material.

8. The method of claim 1, wherein the second material adds thermal energy to the first material during sintering.

9. The method of claim 1, wherein the second material has a radiation absorption that is at least 5 times that of the first material.

10. The method of claim 1, wherein the second material has a peak absorbance wavelength no less than 200 nm.

11. The method of claim 1, wherein the first material has a peak absorbance wavelength no greater than 700 nm.

12. The method of claim 1, wherein the EMR has a wavelength no less than 200 nm.

13. The method of claim 1 comprising controlling a distance from the xenon lamp to the substrate, controlling an energy density of EMR provided by the xenon lamp, controlling a spectrum of EMR provided by the xenon lamp, controlling a voltage provided to the xenon lamp, controlling a duration of EMR exposure to the substrate, controlling an area of the substrate exposed to EMR, controlling a volume of the substrate exposed to EMR, controlling an EMR burst frequency, controlling a number of EMR exposures to the substrate, or combinations thereof.

14. The method of claim 1, wherein the object does not change location between depositing and sintering.

15. The method of claim 1, wherein the electromagnetic radiation has a power output of no less than 1 W.

16. The method of claim 1, wherein the second material has a radiation absorption that is at least 10 times that of the first material.

17. The method of claim 1, wherein the second material has a radiation absorption that is at least 50 times that of the first material.

18. The method of claim 1, wherein the second material has a radiation absorption that is at least 100 times that of the first material.

* * * * *